(12) United States Patent
Hasegawa

(10) Patent No.: US 9,300,840 B2
(45) Date of Patent: Mar. 29, 2016

(54) IMAGE PROCESSING DEVICE AND COMPUTER-READABLE STORAGE MEDIUM STORING COMPUTER-READABLE INSTRUCTIONS

(71) Applicant: Tomohiko Hasegawa, Nagoya (HK)

(72) Inventor: Tomohiko Hasegawa, Nagoya (HK)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/141,061

(22) Filed: Dec. 26, 2013

(65) Prior Publication Data

US 2014/0185104 A1    Jul. 3, 2014

(30) Foreign Application Priority Data

Dec. 27, 2012    (JP) .................................. 2012-286231

(51) Int. Cl.
| | |
|---|---|
| H04N 1/60 | (2006.01) |
| G06K 15/00 | (2006.01) |
| G03F 3/08 | (2006.01) |
| H04N 1/38 | (2006.01) |
| G06T 11/60 | (2006.01) |
| H04N 1/41 | (2006.01) |
| H04N 1/407 | (2006.01) |
| G06K 9/00 | (2006.01) |

(52) U.S. Cl.
CPC *H04N 1/38* (2013.01); *G06T 11/60* (2013.01); *H04N 1/407* (2013.01); *H04N 1/41* (2013.01); *G06K 9/00456* (2013.01); *G06T 2207/20144* (2013.01); *H04N 1/4072* (2013.01); *H04N 1/4074* (2013.01); *H04N 1/6027* (2013.01); *H04N 1/6072* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,903,145 | A | 2/1990 | Funada | |
| 5,075,788 | A * | 12/1991 | Funada | .......................... 358/2.1 |
| 5,848,182 | A * | 12/1998 | Kanamori | ...................... 382/171 |
| 5,889,885 | A * | 3/1999 | Moed et al. | .................... 382/172 |
| 6,028,958 | A * | 2/2000 | Kanamori | ...................... 382/171 |

(Continued)

FOREIGN PATENT DOCUMENTS

| | | |
|---|---|---|
| EP | 1 416 717 A1 | 5/2004 |
| JP | 3-104380 H | 5/1991 |

(Continued)

OTHER PUBLICATIONS

Extended European Search Report issued in related application EP 13199908.8, mailed Sep. 15, 2014.

Primary Examiner — Richard Zhu
(74) Attorney, Agent, or Firm — Merchant & Gould P.C.

(57) ABSTRACT

An image processing device may generate text image data and background image data, based on original image data. The background image data may be generated by performing a correction process on target image data for setting a value of a first-type pixel having a tone value within a specific range before the correction process is performed to a tone value within the specific range after the correction process is performed, and setting a value of a second-type pixel having a tone value out of the specific range before the correction process is performed to a tone value within the specific range after the correction process is performed. The specific range may include a plurality of consecutive tone values that include a peak tone value. The peak tone value is included in a tone value distribution of the original image data and corresponds to a background of a text.

30 Claims, 15 Drawing Sheets

(56) References Cited

U.S. PATENT DOCUMENTS

| | | | |
|---|---|---|---|
| 6,275,620 B2 * | 8/2001 | de Queiroz | 358/462 |
| 6,400,844 B1 * | 6/2002 | Fan et al. | 382/173 |
| 6,643,399 B1 | 11/2003 | Fujiwara | |
| 6,879,416 B2 * | 4/2005 | Shimizu | G06K 15/1209 358/1.9 |
| 6,917,707 B1 * | 7/2005 | Kubota | 382/176 |
| 6,920,245 B1 * | 7/2005 | Hirayama | 382/167 |
| 7,099,042 B2 * | 8/2006 | Yaguchi | 358/1.9 |
| 7,805,022 B2 * | 9/2010 | Tanaka | 382/298 |
| 8,395,832 B2 * | 3/2013 | Iwamoto | G06T 5/009 358/1.9 |
| 2001/0053248 A1 | 12/2001 | Maeda | |
| 2003/0002736 A1 * | 1/2003 | Maruoka et al. | 382/168 |
| 2004/0114188 A1 * | 6/2004 | Toyofuku | 358/3.23 |
| 2004/0234148 A1 | 11/2004 | Yamada | |
| 2005/0041267 A1 * | 2/2005 | Hirayama | 358/2.1 |
| 2005/0069217 A1 | 3/2005 | Mukherjee | |
| 2005/0180645 A1 | 8/2005 | Hasegawa et al. | |
| 2006/0067575 A1 * | 3/2006 | Yamada | 382/176 |
| 2007/0291288 A1 | 12/2007 | Campbell et al. | |
| 2008/0267529 A1 | 10/2008 | Bradburn | |
| 2011/0255777 A1 | 10/2011 | Matsuoka | |
| 2013/0004066 A1 * | 1/2013 | Butler | H04N 1/6027 382/165 |

FOREIGN PATENT DOCUMENTS

| | | |
|---|---|---|
| JP | 5-225378 H | 9/1993 |
| JP | 2002-288589 A | 10/2002 |
| JP | 2003-46746 A | 2/2003 |
| JP | 2004-362541 A | 12/2004 |
| JP | 2005-12768 A | 1/2005 |
| JP | 2006-93880 A | 4/2006 |
| JP | 2008-28717 A | 2/2008 |

* cited by examiner

TEXT COLOR
VALUE TC = (Rt, Gt, Bt)

BACKGROUND COLOR
VALUE BC = (Rb, Gb, Bb)

FIRST EMBODIMENT
R VALUE CORRECTION PROFILE (ONE-DIMENSIONAL LUT)

Fig.15 FOURTH ILLUSTRATIVE EMBODIMENT
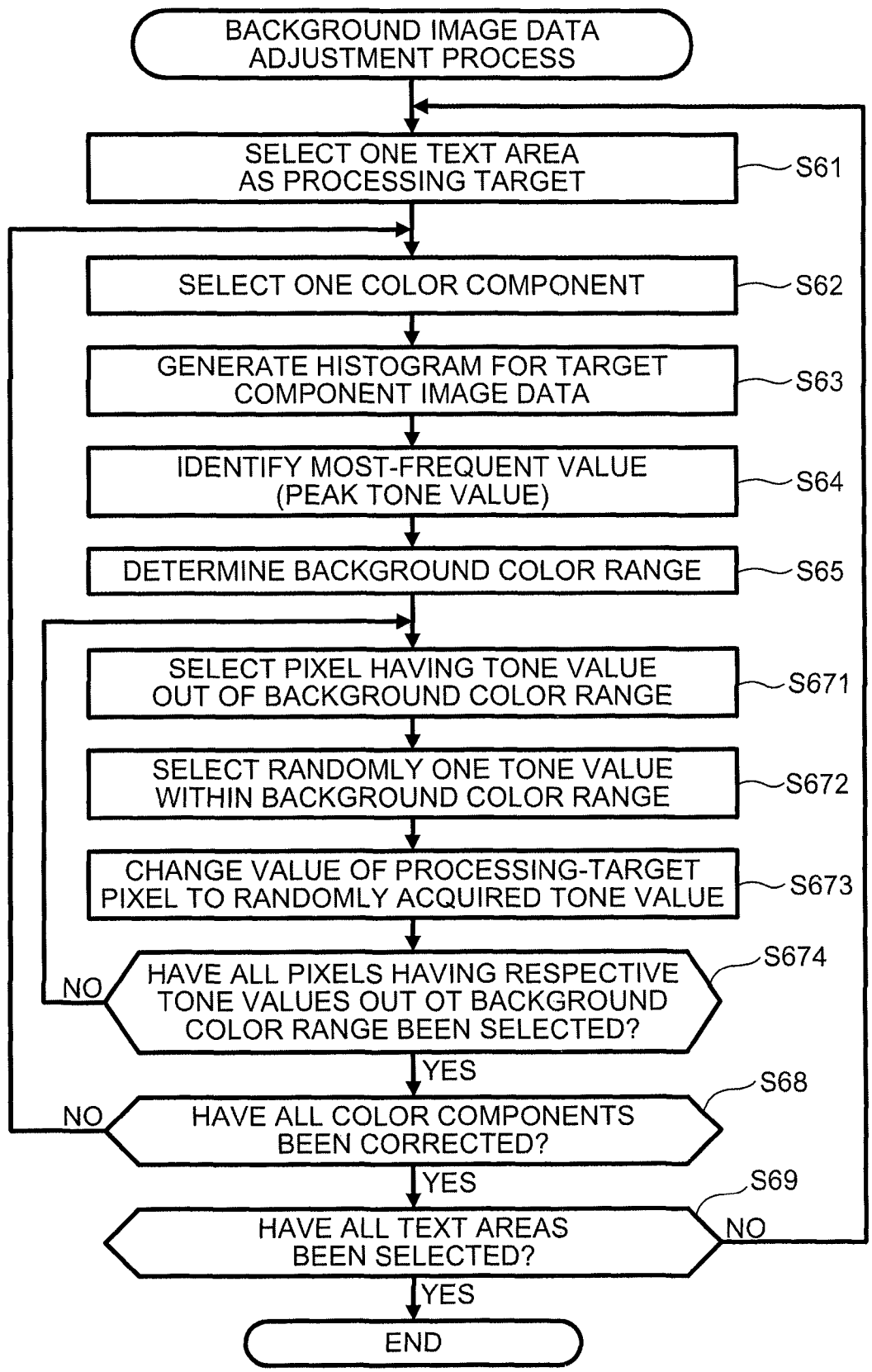

IMAGE PROCESSING DEVICE AND COMPUTER-READABLE STORAGE MEDIUM STORING COMPUTER-READABLE INSTRUCTIONS

CROSS-REFERENCE TO RELATED APPLICATION

This application claims priority from Japanese Patent Application No. 2012-286231, filed on Dec. 27, 2012, which is incorporated herein by reference.

TECHNICAL FIELD

The present disclosure relates to image processing, and more particularly, to a technique of generating a background image in which text included in an original image disappears.

BACKGROUND

There has been known a technique of generating both (1) text image data that represents text and (2) background image data that does not include any text, based on original image data that represents an original image including the text. In the known technique, the text image data that represents the text (e.g., binary data) is generated based on the original image data, and the text image data is formed from text pixels constituting the text and background pixels not constituting the text. In the known technique, a color of pixels of the original image data corresponding to the text pixels of the text image data is changed to a color of pixels of the original image corresponding to the background pixels of the text image data to create the background image data. Thus, the background image data is generated based on the original image data. The text image data is compressed by a compression method suitable for compression of the text image data (e.g., the Modified Modified Read ("MMR") method) and the background image data is compressed by another compression method suitable for compression of the background image data (e.g., the Joint Photographic Experts Group ("JPEG") method). By separating background image data from text image data, the entire original image data can be compressed at higher compressibility.

For example, when sharpness of text in an original image is low, in other words, when text is blurred, there may be a possibility that a text outline remains in a background image. In the known technique, the background image data is generated using text image data in which a line width of text is increased, resulting in a reduction of the possibility that the text outline remains in the background image.

SUMMARY

Nevertheless, in the known technique, for example, there may still be a possibility that the text outline remains in the background image when the line width of the text cannot be increased appropriately. According to example aspects of the present disclosure, a technique is disclosed for reducing obtrusiveness of a text outline that tends to remain in a background image in which text included in an original image disappears.

The example embodiments discussed herein have been made to solve at least some of the above-described problems, and can be implemented as described below.

According to one or more aspects of the disclosure, an image processing device includes a processor configured to: generate text image data representing a text image based on original image data representing an original image; and generate background image data representing a background image based on the original image data. The background image represents an image in which text in the original image has disappeared. To generate the background image data, the processor is configured to: perform a correction process on target image data as a processing target for setting a value of a first-type pixel having a tone value within a specific range before the correction process is performed to a tone value within the specific range after the correction process is performed, and setting a value of a second-type pixel having a tone value out of the specific range before the correction process is performed to a tone value within the specific range after the correction process is performed. The specific range may include a plurality of consecutive tone values. The plurality of consecutive tone values included within the specific range may include a peak tone value that is included in a tone value distribution of the original image data and corresponds to a background of the text.

According to one or more further aspects of the disclosure, an image processing device comprises a processor configured to: obtain background image data representing a background image, wherein the background image represents an image including an outline of text; and perform a correction process on the background image data for setting a value of a first-type pixel having a tone value within a specific range before the correction process is performed to a tone value within the specific range after the correction process is performed, and a value of a second-type pixel having a tone value out of the specific range before the correction process is performed to a tone value within the specific range after the correction process is performed. The correction process includes a process for reducing obtrusiveness of the outline of the text in the background image. The specific range includes a plurality of consecutive tone values. The plurality of consecutive tone values included within the specific range include a peak tone value that is included in a tone value distribution of the background image data and corresponds to a background of the outline of the text.

According to one or more additional aspects of the disclosure, a computer-readable storage medium storing computer-readable instructions is disclosed. When executed, the computer-readable instructions cause a processor to perform a method including: generating text image data representing a text image based on original image data representing an original image; and generating background image data representing a background image based on the original image data. The background image represents an image in which text in the original image has disappeared. The generating of the background image data includes: performing a correction process on target image data as a processing target for setting a value of a first-type pixel having a tone value within a specific range before the correction process is performed to a tone value within the specific range after the correction process is performed, and setting a value of a second-type pixel having a tone value out of the specific range before the correction process is performed to a tone value within the specific range after the correction process is performed. The specific range includes a plurality of consecutive tone values. The plurality of consecutive tone values included within the specific range include a peak tone value that is included in a tone value distribution of the original image data and corresponds to a background of the text.

According to one or more additional aspects of the disclosure, a computer-readable storage medium storing computer-readable instructions that, when executed, cause a processor to perform a method including: obtaining background image data representing a background image, wherein the background image represents an image including an outline of text; and performing a correction process on the background image data for setting a value of a first-type pixel having a tone value within a specific range before the correction process is performed to a tone value within the specific range after the correction process is performed, and setting a value of a second-type pixel having a tone value out of the specific range before the correction process is performed to a tone value within the specific range after the correction process is performed. The correction process includes a process for reducing obtrusiveness of the outline of the text in the background image. The specific range includes a plurality of consecutive tone values. The plurality of consecutive tone values included within the specific range include a peak tone value that is included in a tone value distribution of the background image data and corresponds to a background of the outline of the text.

The objects, features, and advantages described herein can be accomplished in various manners, such as using methods for implementing the function of an image processing device. Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 15 is a flowchart of a background image data adjustment process according to a fourth example embodiment.

DETAILED DESCRIPTION

Figure 1:
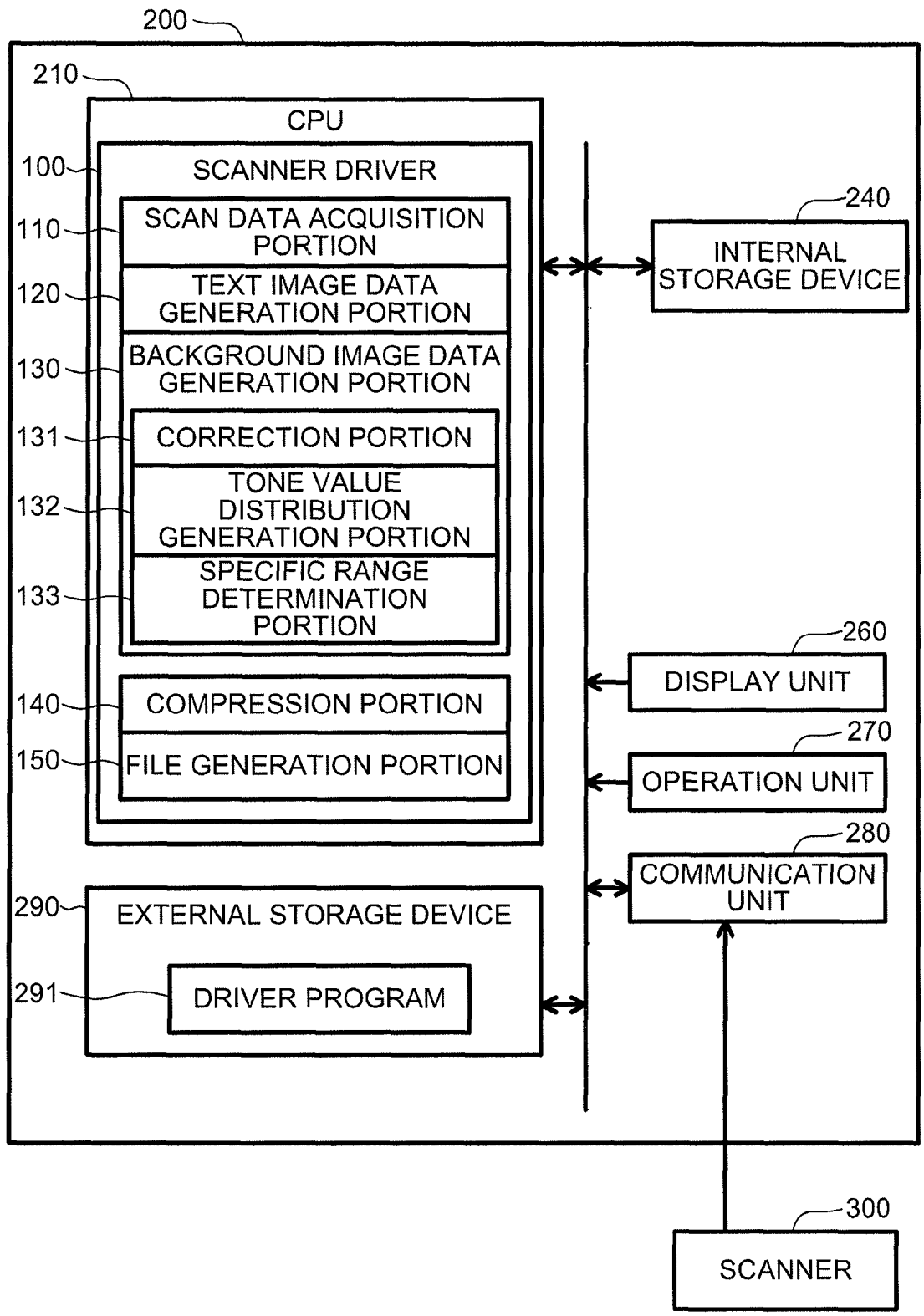
FIG. 1 is a block diagram depicting a configuration of a computer as an image processing device according to an example embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to image processing, for example to generate a background image in which text included in an original image disappears, while capturing text image data from that original image. The text image data and background image can be separately compressed. In some cases, because at least a portion of the background image data has pixel color values within a narrower range of values as compared to the original image data, the background image data is more compressible than the original image data. In accordance with the present disclosure, lingering shadow features that may be present in original image data (and which may be exacerbated due to low quality text segments, such as blurred text) can be addressed by any of a variety of embodiments in which background color data is selected to replace text shadow features that would otherwise remain in the background image.

A. First Example Embodiment

A-1. Configuration of Image Processing Device

Embodiments of the present disclosure will be described in accordance with examples. FIG. 1 is a block diagram depicting a configuration of a computer 200 as an image processing device according to a first embodiment.

The computer 200 is, for example, a personal computer, and comprises a central processing unit ("CPU") 210, an internal storage device 240 including a read-only memory ("ROM") and a random-access memory ("RAM"), a display unit 260 such as a liquid crystal display, an operation unit 270 such as a mouse and a keyboard, a communication unit 280 for communicating with an external device, and an external storage device 290 such as a hard disk drive. In alternative embodiments, other computer-readable storage media, incorporated into computer storage devices, could be included in the computer 200 as well.

The computer 200 is connected to the external device, for example, a scanner 300, communicably, via the communication unit 280. The scanner 300 is an image reading device that optically reads a document to acquire scan data.

A buffer area for temporarily storing various intermediate data generated during execution of processing by the CPU 210 is allocated in the internal storage device 240. The external storage device 290 stores a driver program 291 therein. The driver program 291 is supplied with a CD-ROM, for example.

The CPU 210 functions as a scanner driver 100 that performs image processing (see FIG. 2) by execution of the driver program 291. The scanner driver 100 comprises a scan data acquisition portion 110, a text image data generation portion 120, a background image data generation portion 130, a compression portion 140, and a file generation portion 150. The background image data generation portion 130 comprises a correction portion 131, a tone value distribution generation portion 132, and a specific range determination portion 133. The scan data acquisition portion 110 acquires scan data as original image data according to this embodiment. The text image data generation portion 120 generates text image data representing a text image, based on the original image data. The background image data generation portion 130 generates background image data based on the original image data. The background image data represents a background image in which text in an original image has disappeared. The compression portion 140 compresses the text image data and the background image data using different compression methods, respectively, to generate compressed text image data and compressed background image data. The file generation portion 150 generates an image file representing one image, using both the compressed text image data and the compressed background image data. The image file generated in this embodiment is a PDF file in which relatively higher compressibility can be accomplished (i.e., a high compression PDF file).

Although in the embodiment shown the computer 200 and scanner 300 are separate and communicatively connected to one another, in example alternative embodiments the computer 200 and scanner 300 are integrated such that the same device that acquires scan data can perform one or more of the image processing operations described herein. In still further embodiments, the computer 200 and scanner 300 can be remote from one another, or the computer could include a plurality of networked (e.g., local and remote) computers, such that image processing can be performed remotely from the location at which scan data is captured.

Although particular features are discussed herein as included within a computer 200, it is recognized that in certain embodiments not all such components or features may be included within a computer executing according to the methods and systems of the present disclosure. Furthermore, different types of hardware and/or software systems could be incorporated into such an electronic computing device.

In accordance with the present disclosure, the term computer readable media may include computer readable storage media and communication media. As used in this document, a computer storage medium is a device or article of manufacture that stores data and/or computer-executable instructions. Computer readable storage media may include volatile and nonvolatile, removable and non-removable devices or articles of manufacture implemented in any method or technology for storage of information, such as computer readable instructions, data structures, program modules, or other data. By way of example, and not limitation, computer readable storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer readable storage media generally includes at least some tangible component on which computer-executable instructions can be stored, and can be included in a computer storage device such as any of the devices discussed above. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A-2. Image Processing

Figure 2:
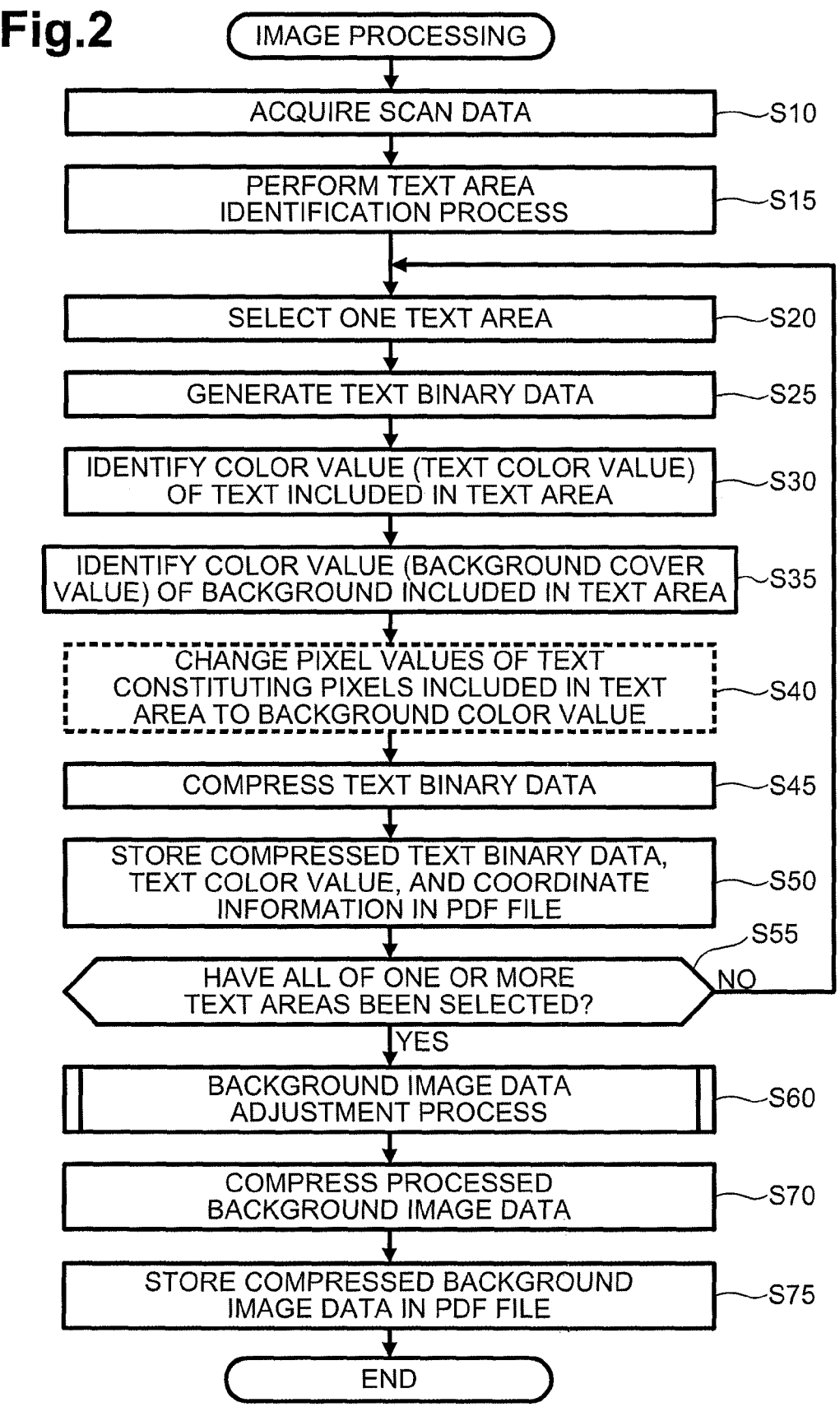
FIG. 2 is a flowchart of image processing, according to example embodiments of the present disclosure.

FIG. 2 is a flowchart of image processing, according to an example embodiment of the present disclosure. The image processing may be performed by the scanner driver 100 in response to a user providing an instruction to read a document (e.g., an instruction to generate scan data) to the scanner driver 100, for example after setting the document in the scanner 300.

In step S10, the scan data acquisition portion 110 acquires scan data as processing-target original image data. More specifically, the scan data acquisition portion 110 controls the scanner 300 to read a document prepared by the user to acquire scan data. Hereinafter, the scan data acquired in step S10 is referred to as "original image data" and an image represented by the scan data is referred to as an "original image".

In example embodiments, the original image data is RGB image data, and each of a plurality of pieces of pixel data constituting the original image data includes three color component values (e.g., an R value, a G value, and a B value) of red ("R"), green ("G"), and blue ("B"). In such example embodiments, each color component can include 256 tones. It can be construed that the RGB image data includes three pieces of component image data (e.g., R-component image data, G-component image data, and B-component image data) corresponding to the three color components, respectively. Each component image data is image data having one of the color component values as a value of a pixel. Hereinafter, each of the three component values included in pixel data is referred to as "value of a pixel" simply.

Figure 3A:
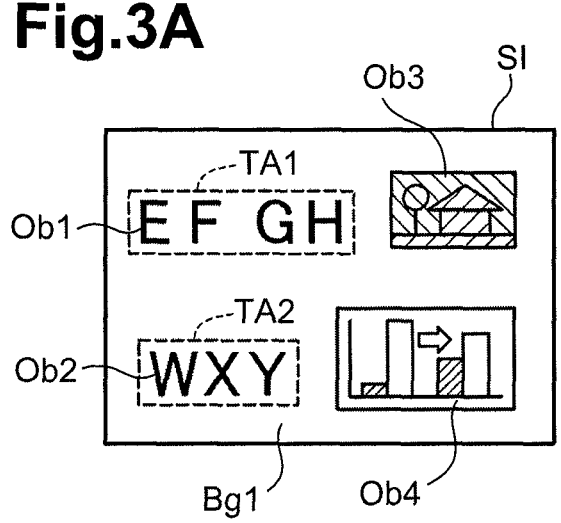
FIGS. 3A, 3B, 3C, and 3D each depict an example of an image used in the image processing.
Figure 3B:
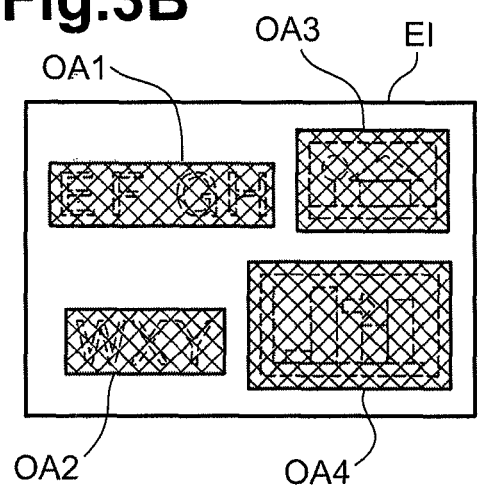

FIGS. 3A, 3B, 3C, and 3D each illustrate an example of an image to be used in image processing. FIG. 3A illustrates an example of an original image SI. The original image SI comprises a background Bg1 and four objects Ob1, Ob2, Ob3, and Ob4, that is, text objects Ob1 and Ob2, a photograph object Ob3, and a drawing object Ob4. The drawing object Ob4 represents, for example, an illustration, table, chart, diagram, or pattern.

In step S15 (see FIG. 2), the scanner driver 100 performs a text area identification process in which a text area is identified in the original image SI. More specifically, the scanner driver 100 applies an edge detection filter, for example, the Sobel filter, to the original image data to generate edge image data representing an edge image EI (see FIG. 3B). The scanner driver 100 identifies, in the edge image EI, an area whose edge intensity is greater than a reference value, so as to determine an area in the original image SI, corresponding to the identified area in the edge image EI, as an object area. In the example depicted in FIG. 3B, four object areas OA1-OA4 corresponding to the four objects Ob1-Ob4, respectively, of the original image SI are identified in the edge image EI. The scanner driver 100 determines whether each of the object areas OA1-OA4 is a text area, based on a color distribution of each of the object areas OA1-OA4 in the original image SI. More specifically, in some embodiments the scanner driver 100 calculates varieties C of intensity values included in one object area, using an intensity histogram for the object area. The scanner driver 100 classifies a plurality of pixels included in the object area as either a background pixel having a color similar to a color of an area surrounding the object area (e.g., a background color) or an object pixel other than the background pixel, and calculates a ratio D of the number of the object pixels to the number of the background pixels. There is a tendency that the varieties C of the intensity values and the ratio D of the object pixels to the background pixels in a text object are less than those of the other type objects. Thus, the scanner driver 100 determines the evaluation-target object area as the text area when the varieties C of the intensity values in the evaluation-target object area is less than a first threshold value and the ratio D of the object pixels to the background pixels in the evaluation-target object area is less than a second threshold value. In the example depicted in FIG. 3A, text areas TA1 and TA2 corresponding to the text objects Ob1 and Ob2, respectively, are identified in the original image SI.

Other known methods can be adopted to the method of identifying a text area. At least some known methods are disclosed in, for example, Japanese Laid-Open Patent Publication Nos. Hei 5-225378 and 2002-288589, the disclosures of which are each hereby incorporated by reference in their entireties.

In step S20, the scanner driver 100 selects one text area as a processing-target. In the example depicted in FIG. 3A, one text area is selected in turn from the identified text areas TA1 and TA2.

In step S25, the text image data generation portion 120 generates text binary data (e.g., text image data) corresponding to the processing-target text area. More specifically, the text image data generation portion 120 acquires partial image data representing the processing-target text area from the original image data, and performs a binarization on the partial image data. In some embodiments, the text image data generation portion 120 calculates RGB values (BR, BG, BB) representing the color of the area surrounding the processing-target text area. When all component values (Ri, Gi, Bi) of a pixel i constituting the processing-target text area satisfy respective expressions (1), (2), and (3) below, the text image data generation portion 120 assigns "0" to a value of a pixel, corresponding to the pixel i, of text binary data. When one or more of the component values (Ri, Gi, Bi) of the pixel i constituting the processing-target text area do not satisfy the respective expressions (1), (2), and (3), the text image data generation portion 120 assigns "1" to the value of the pixel, corresponding to the pixel i, of the text binary data.

$$BR-\Delta V<Ri<BR+\Delta V \quad (1)$$

$$BG-\Delta V<Gi<BG+\Delta V \quad (2)$$

$$BB-\Delta V<Bi<BB+\Delta V \quad (3)$$

In the text binary data, a pixel having the value "1" is a text constituting pixel constituting text, and a pixel having the value "0" is a background pixel not constituting text. As understood from expressions (1), (2), and (3) above, when the color of the pixel i is substantially the same as the color of the surrounding area (e.g., when a difference in color value between the pixel i and the surrounding area is smaller than $\Delta V$), the pixel i is classified into the background pixel. When the color of the pixel is different from the color of the surrounding area (e.g., when the difference in color value between the pixel i and the surrounding area is $\Delta V$ or greater), the pixel i is classified as a text constituting pixel.

Figure 3C:
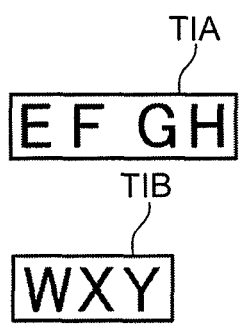

The pixel of the original image SI (also the pixel of the text area that is the partial image of the original image SI), corresponding to the text constituting pixel of the text binary data, is also referred to as the "text constituting pixel". The pixel of the original image SI (also the pixel of the text area that is the partial image of the original image SI), corresponding to the background pixel of the text binary data, is also referred to as the "background pixel". FIG. 3C depicts binary images (e.g., text images) TIA and TIB represented by the text binary data corresponding to the text areas TA1 and TA2 of the original image SI.

In step S30 (see FIG. 2), the scanner driver 100 identifies a text color value (e.g., R, G, and B values) representing the color of the text included in the text area. More specifically, the scanner driver 100 identifies a plurality of text constituting pixels included in the text area, based on the text binary data. The scanner driver 100 determines that a value that occurs most frequently (hereinafter, referred to as a "most-frequent value") in each of the R, G, and B values (e.g., the color values) of each text constituting pixel included in the text area, as the text color value.

In step S35, the scanner driver 100 identifies a background color value (e.g., R, G, and B values) representing the color of the background in the text area. More specifically, the scanner driver 100 identifies a plurality of background pixels included in the text area, based on the text binary data. The scanner driver 100 determines that a most-frequent value in each of the R, G, and B values (e.g., the color values) of each background pixel included in the text area, as the background color value.

In step S40, the background image data generation portion 130 changes the respective values of the plurality of text constituting pixels included in the text area to the background color value determined in step S35. The background image data generation portion 130 identifies the plurality of text constituting pixels included in the text area, based on the text binary data. As a result, the text included in the processing-target text area disappears from the original image SI. That is, the processing of step S40 is part of processing for generating background image data representing a background image BI in which the text of the original image SI has disappeared. The processing of step S40 in FIG. 2 is enclosed with a dashed line because the processing of step S40 can be omitted as described later.

In step S45, the compression portion 140 compresses the text binary data to generate compressed text binary data. When a text image represented by the text binary data has a lower resolution, edge roughness becomes conspicuous and legibility of the text image is degraded. Thus, the compression portion 140 generates the compressed text binary data, using the MMR method (also referred to as FAXG4 method) that is a lossless compression method in which the binary data can be compressed at higher compressibility without the resolution of the binary data being lowered.

In step S50, the file generation portion 150 stores the compressed text binary data, the text color value, and coordinate information in a file in association with each other. In example embodiments, the file is stored as a PDF file, but instead of this, the file may be stored as an XPS file. The coordinate information represents a location of the binary image (e.g., the text image) represented by the compressed text binary data with respect to the original image SI.

In step S55, the scanner driver 100 determines whether all of the one or more text areas have been selected as the processing target. When all of the one or more text areas have not been selected (e.g., step S55:NO), the routine returns to step S20. Then, the scanner driver 100 selects a yet-to-be selected text area and performs the above-described processing of steps S25 to S50. When all of the one or more text areas have been selected (e.g., step S55:YES), the routine proceeds to step S60.

Figure 3D:
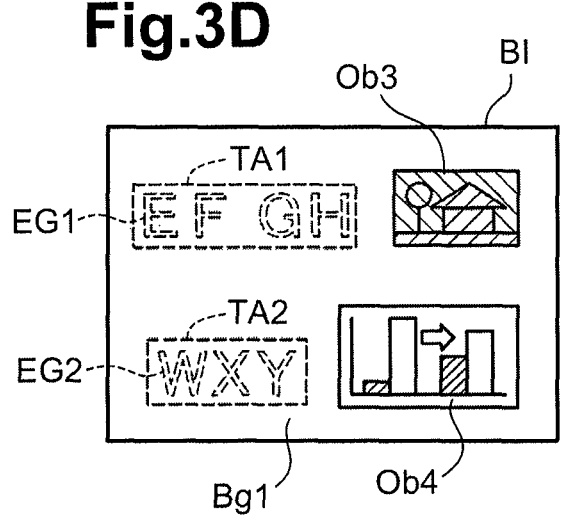

At the time the routine proceeds to step S60, the background image data representing the background image BI (see FIG. 3D) in which the text of the original image SI has disappeared has been generated. As depicted in FIG. 3D, the background image BI comprises the photograph object Ob3 and the drawing object Ob4 as well as the background Bg1, but does not comprise the text objects Ob1 and Ob2.

Although the background image BI does not comprise the text objects Ob1 and Ob2, there is a possibility that the background image BI comprises edges EG1 and EG2 (or outlines) of the text objects Ob1 and Ob2 (see FIG. 3D). In a border between each of the text objects Ob1 and Ob2 of the original image SI and the background (e.g., the background Bg1), a boundary area that has a color between the text color and the background color may appear. This phenomenon occurs because pixels included in the boundary area (also referred to as "boundary area pixels") are generated based on both of light reflected at a text portion of the document and light reflected at a background portion of the document when the original image data is generated by which the document is read by the scanner 300. The color of the boundary area pixels differs from the color of the text. Therefore, in some cases, the boundary area pixels are classified into the background pixel, instead of the text constituting pixel, when text binary data is generated. When the background image data is generated by erasing the text, that is, when the values of the text constituting pixels are changed to the background color value (e.g., step S40), the boundary area pixels that would be classified into the background pixel are out of the target to be changed. Thus, the colors of the boundary area pixels in the background image BI are kept to the same as the colors of the boundary area pixels in the original image SI. The colors of the boundary area pixels also differ from the colors of the background pixels surrounding the boundary area pixels. Therefore, the edges EG1 and EG2 represented by the boundary area pixels appear in the background image BI.

In step S60, the background image data generation portion 130 performs a background image data adjustment process for reducing obtrusiveness of the edges EG1 and EG2 appearing in the background image BI. This process will be described in detail below. Through this process, the obtrusiveness of the edges EG1 and EG2 appearing in the background image BI may be reduced to the extent that the edges EG1 and EG2 cannot be identified visually.

In step S70, the compression portion 140 compresses the background image data on which the background image data adjustment process has been performed (also referred to as "processed background image data"), so as to generate compressed background image data. The processed background image data is RGB image data representing the background image BI comprising a photograph and/or a drawing without text. The compression portion 140 compresses the processed background image data, using the JPEG method suitable for the compression of such a multi-tone image. The compression portion 140 further compresses the processed background image data that has been compressed by the JPEG method, for example using the Deflate method, so as to generate the compressed background image data.

In the JPEG compression, the compression portion 140 converts the processed background image data (e.g., the RGB image data) into YCrCb image data. The compression portion 140 divides the background image BI represented by the processed background image data into a matrix of eight-by-eight pixel blocks and then performs a two-dimensional discrete cosine transform ("DCT") for each independent block to transform the background image BI into DCT coefficients representing frequency components of eight types in a vertical direction and eight types in a horizontal direction. Further, the compression portion 140 obtains quantized coefficients for each block by dividing the obtained DCT coefficients of each block by corresponding quantization threshold values specified in a quantization table (not depicted). The compression portion 140 compresses the processed background image data using Huffman encoding in which the obtained quantized coefficients are encoded with being arranged in a predetermined scanning order. As understood from this explanation, in the JPEG compression, as evenness of the compression-target image data is higher, that is, each frequency component is smaller, the number of quantized coefficients having "0" increases. Therefore, higher compressibility is applied to the compression-target image data having higher evenness. In this embodiment, the obtrusiveness of the edges EG1 and EG2 appearing in the background image BI is reduced by the background image data adjustment process in step S60. That is, because the evenness of the compression-target background image data is increased by the background image data adjustment process, the compressibility applied in the compression performed in step S70 can be heightened.

In step S75, the file generation portion 150 stores the compressed background image data in the PDF file in which the compressed text binary data has been stored in step S50, to complete a high compression PDF file CF. After the high compression PDF file CF is generated, the image processing ends.

Figure 4:
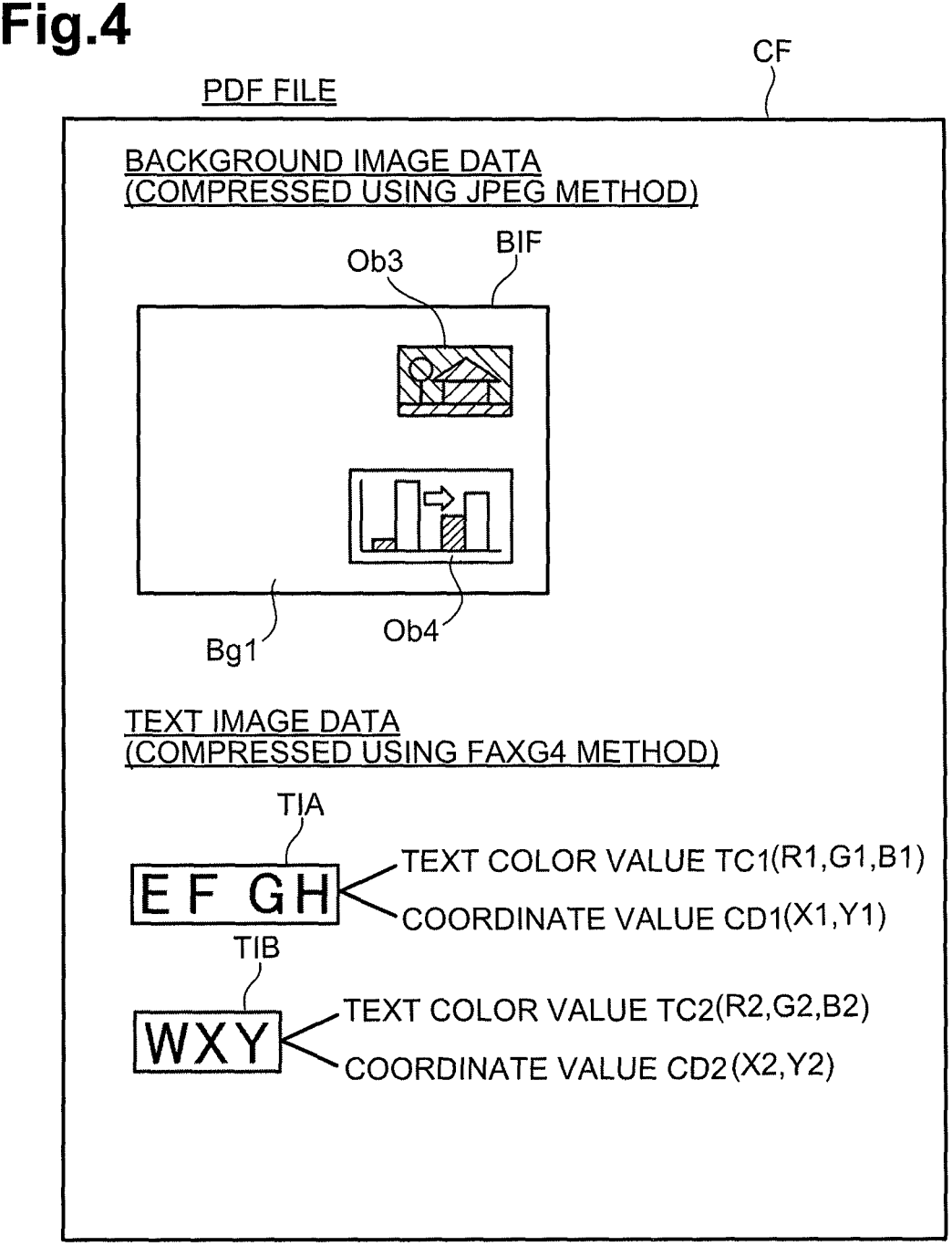
FIG. 4 is a conceptual diagram depicting a high compression PDF file.

FIG. 4 is a conceptual diagram of the high compression PDF file CF. The PDF file is capable of storing a plurality of pieces of image data in various formats as a single file. When the plurality of pieces of image data stored in the PDF file are displayed, the PDF file can reproduce the plurality of pieces of image data as a single image by superimposing them on top of each other.

The compressed background image data is stored in the high compression PDF file CF, as image data positioned in a lowermost layer. The compressed text binary data is stored in the high compression PDF file CF, as image data positioned in a layer higher than the compressed background image data.

A text color value TC1 (R1, G1, B1) and a coordinate value CD1 (X1, Y1) are associated with the compressed text binary data representing the binary image TIA. A text color value TC2 (R2, G2, B2) and a coordinate value CD2 (X2, Y2) are associated with the compressed text binary data representing the binary image TIB. Each of text color values TC1 and TC2 includes the RGB values that represent the text color and have been calculated in step S30. The coordinate values CD1 and CD2 represent locations of the respective binary images TIA and TIB with respect to the background image BIF. Each of the coordinate values CD1 and CD2 is represented by, for example, a coordinate value of a pixel located at an upper left corner of a smallest rectangular circumscribed on each of the binary images TIA and TIB.

With the transformation of the original image data into the high compression PDF file CF, the image in which each object included in the original image SI is represented with image quality suitable for each object type can be stored in a storage manner of relatively less volume of data. That is, in the image represented by the high compression PDF file CF, the edges of the text are represented sharply and the drawing and/or the photograph are represented with image quality with emphasis on gradations.

A-3. Background Image Data Adjustment Process

Figure 5:
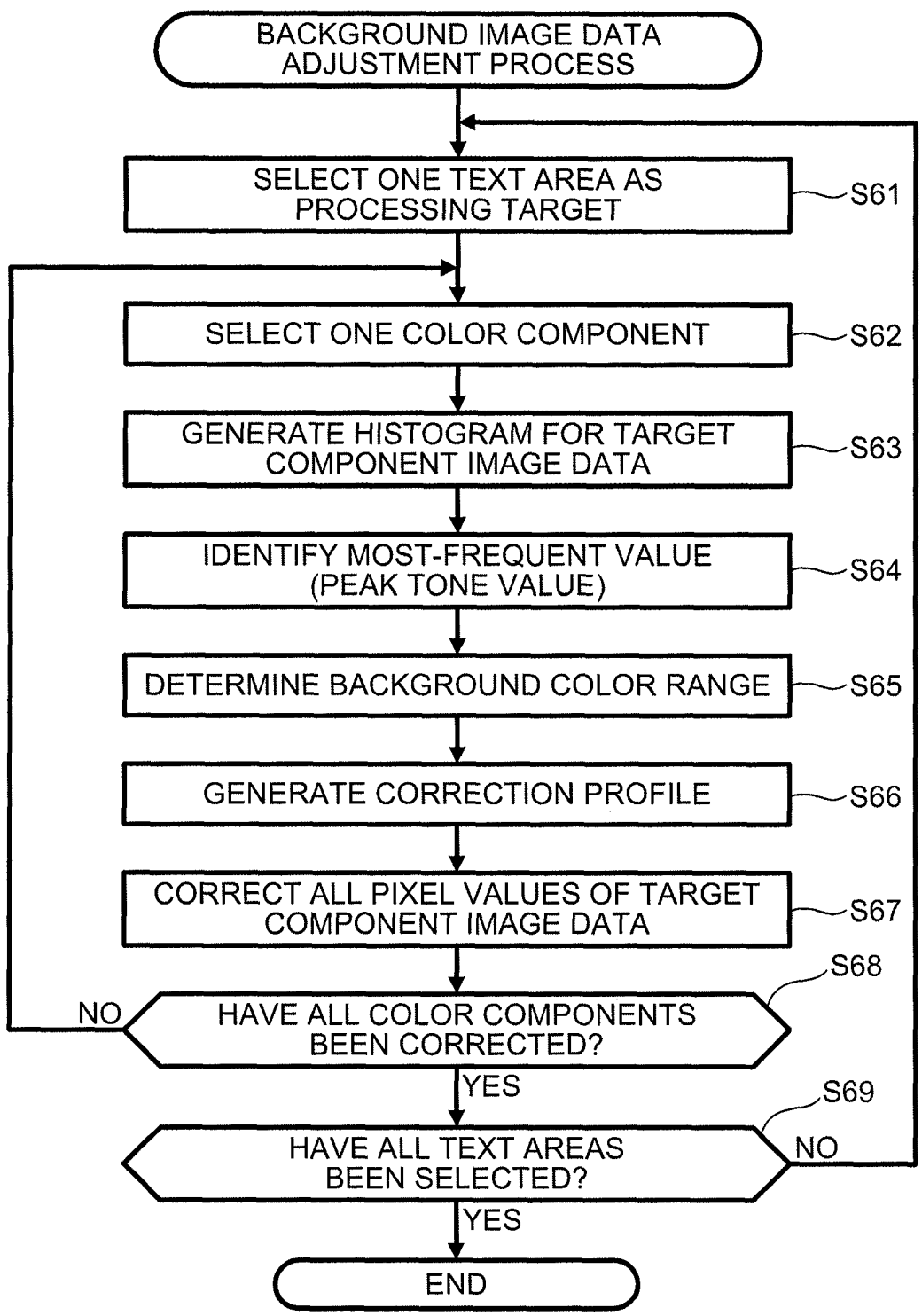
FIG. 5 is a flowchart of a background image data adjustment process, according to example embodiments of the present disclosure.

A detail of the background image data adjustment process in step S60 in FIG. 2 will be described. FIG. 5 is a flowchart of the background image data adjustment process, according to an example embodiment.

In step S61, the background image data generation portion 130 selects one text area in the background image BI, as a processing target. In the example depicted in FIG. 3D, one text area is selected in turn from the text areas TA1 and TA2 in which the edges EG1 and EG2 remain, respectively. Partial image data, corresponding to the processing-target text area, of the background image data is also referred to as "target partial image data".

In step S62, the background image data generation portion 130 selects one color component, as a processing target, from the three color components of the R, G, and B. In some embodiments, the target partial image data is transformed into another color space, such as a CMY color space or a YCbCr color space, before step S62. In such embodiments, in step S62, one component may be selected from the color components represented by the transformed color space. Component image data, corresponding to the processing-target color component, of the target partial image data is also referred to as "target component image data".

In step S63, the tone value distribution generation portion 132 generates histogram data that represents a distribution of tone values for the processing-target text area with respect to the processing-target color component. That is, the tone value distribution generation portion 132 generates the histogram data for the target component image data. The histogram data is obtained by which each pixel of the target component image data is classified into one of a plurality of classes in accordance with the value of each pixel. In this embodiment, the histogram data is generated while each of 256 tone values is regarded as one class.

Figure 6A:
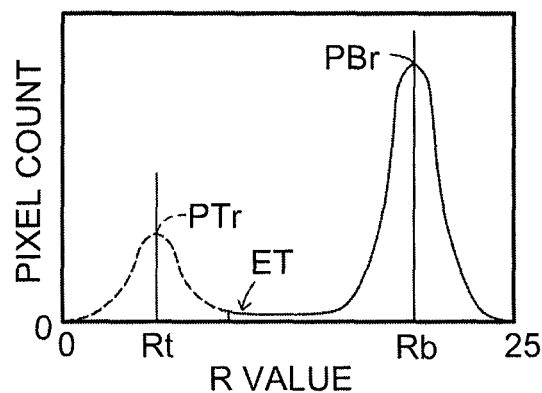
FIGS. 6A, 6B, and 6C each illustrate an example of a histogram for target component image data.
Figure 6B:
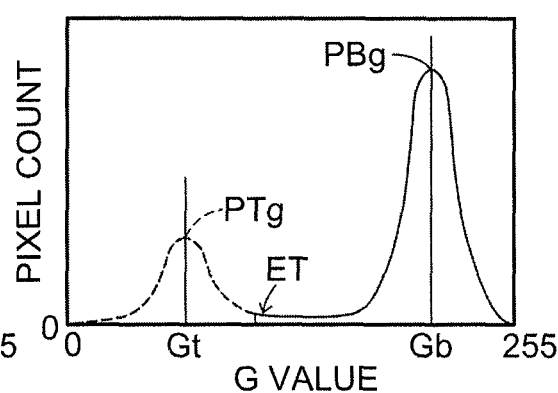
Figure 6C:
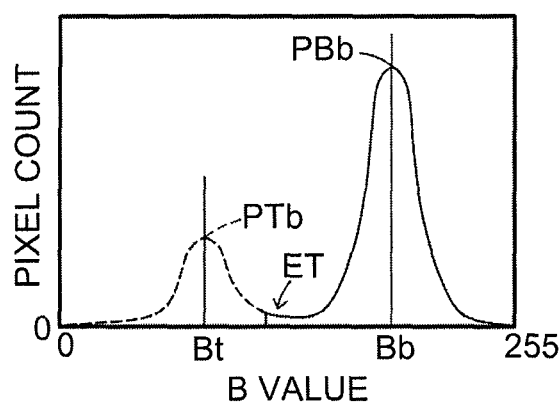

FIGS. 6A, 6B, and 6C each illustrate an example of a histogram for the target component image data. Each of FIGS. 6A, 6B, and 6C illustrates a histogram for one of three pieces of component image data representing one text area. The histograms for the three pieces of component image data include peaks PBr, PBg, and PBb, respectively, corresponding to the background included in the processing-target text area. Each of three tone values Rb, Gb, and Bb corresponding to the three peaks PBr, PBg, and PBb, respectively, corresponding to the background each is referred to as a "peak tone value corresponding to the background". The three peak tone values Rb, Gb, and Bb correspond to a background color value BC (Rb, Gb, Bb) representing the background color.

In the three histograms depicted in FIGS. 6A, 6B, and 6C, a portion indicated by a dashed line corresponds to the text included in the text area of the original image SI. Each of three tone values Rt, Gt, and Bt corresponding to three peaks PTr, PTg, and PTb (e.g., peaks corresponding to the text) included in the respective portions indicated by the dashed line is also referred to as a "peak tone value corresponding to the text". The three peak tone values Rt, Gt, and Bt correspond to the text color value TC (Rt, Gt, Bt) representing the text color. The processing target in the background image data adjustment process according to this embodiment is the text area of the background image BI in which the text has disappeared. Therefore, a dashed line portion does not appear in the histograms in FIGS. 6A, 6B, and 6C. It is conceivable that the tone values of the pixels representing one of the text edge EG1 and EG2 are positioned between a mountain-shaped portion including the peak corresponding to the background and a mountain-shaped portion (e.g., the portion indicated with the dashed line) including the peak corresponding to the text, more specifically, are positioned in a vicinity of a position ET in each of FIGS. 6A, 6B, and 6C.

Figure 7:
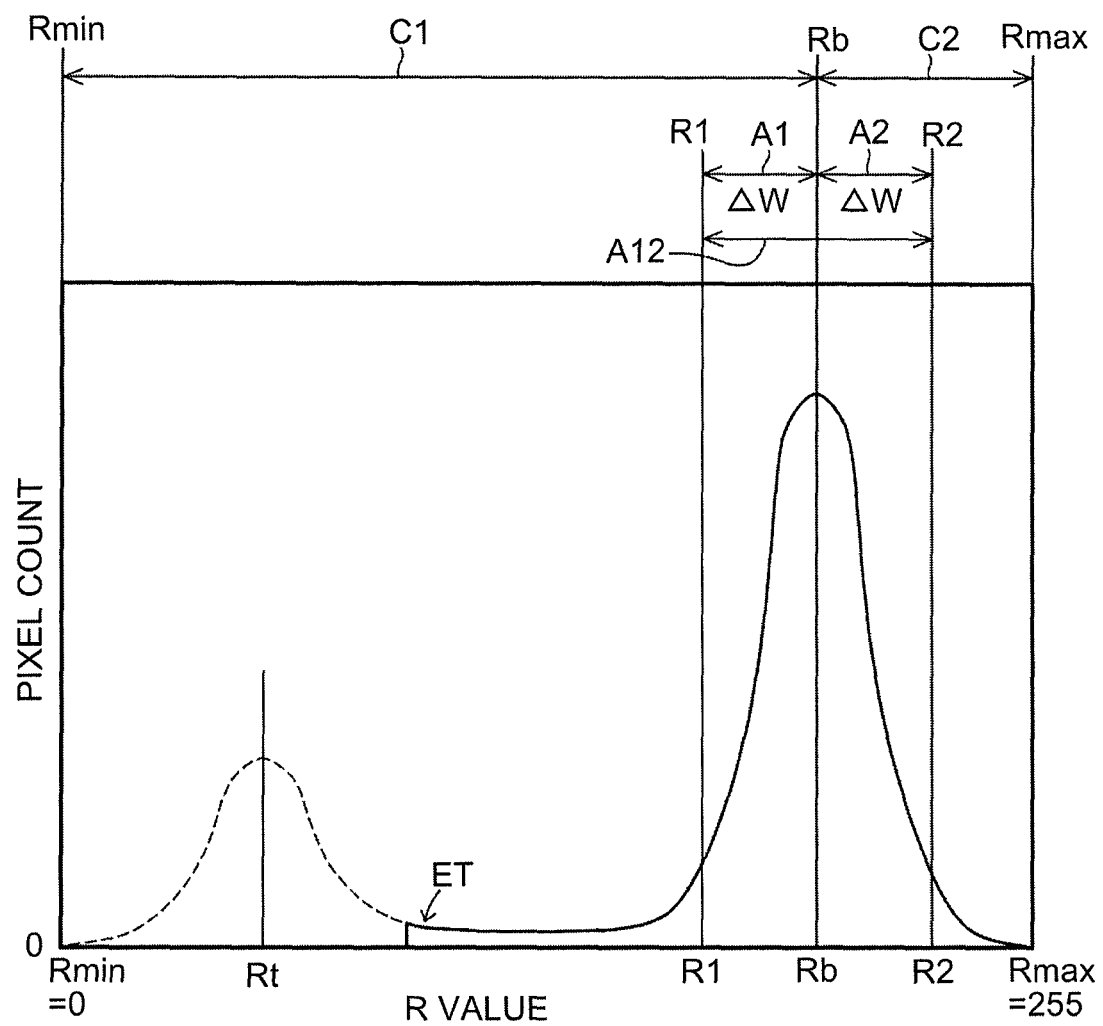
FIG. 7 illustrates an example of a histogram for R-component image data.

Hereinafter, a description will be made by taking a case where the target component image data is R-component image data corresponding to the R-component as an example. FIG. 7 illustrates an example of a histogram for the R-component image data. In step S64, the specific range determination portion 133 identifies a most-frequent value from the values (e.g., the R values) of the plurality of pixels constituting the R-component image data, using the histogram data. As depicted in FIG. 7, a peak tone value Rb of the R-component, corresponding to the background, is identified as the most-frequent value.

In step S65, the specific range determination portion 133 determines a background color range A12 as a specific range to be used for generation of a correction profile. More specifically, a range centered at the peak tone value Rb, that is, a range of R1<R<R2 in FIG. 7, is determined as the background color range A12 of the R-component. A lower limit R1 of the background color range A12 is expressed by (Rb−ΔW) and an upper limit R2 of the background color range A12 is expressed by (Rb+ΔW), where ΔW is a design value. In this embodiment, the value ΔW is predetermined experimentally to cover almost the entire mountain-shaped portion (e.g., a range including relatively higher frequency counts) centered at the peak tone value Rb in the histogram. The value ΔW is set to, for example, 3% to 10% of the total number of tones of the R value. In this embodiment, the value ΔW is set to "15" (i.e., approximately 6% of the total number of tones) that is a fixed value with respect to the total number of "256" tones of the R value. As depicted in FIG. 7, the background color range A12 includes a plurality of consecutive tone values including the peak tone value Rb.

As understood from the description of steps S64 and S65, the specific range determination portion 133 determines the background color range A12 using the histogram data (e.g., the distribution data) for the background image data. As a result, an appropriate background color range A12 can be determined based on the tone value distribution of the background image data.

Figure 8:
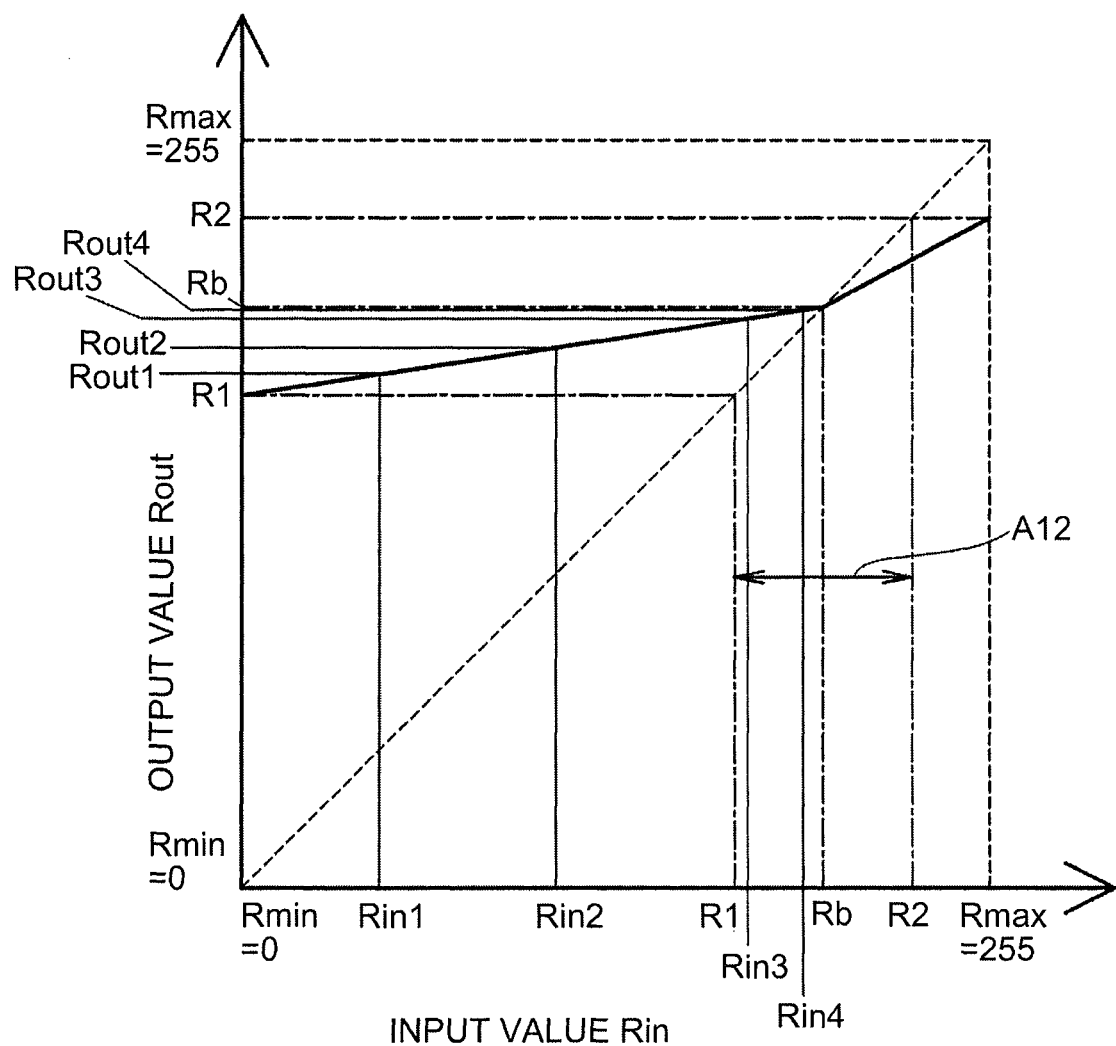
FIG. 8 illustrates a correction profile according to a first example embodiment.

In step S66, the correction portion 131 generates a correction profile based on the determined background color range A12. FIG. 8 illustrates a correction profile according to the first embodiment. The correction profile is a one-dimensional lookup table that specifies a correspondence between an input value Rin and an output value Rout. The correction profile is expressed by expression (4) below.

$$Rout = Rin \times \left(\frac{Rb - R1}{Rb - R\min}\right) + R1 (R\min \le Rin < Rb) \quad (4)$$

$$Rout = (Rin - Rb) \times \left(\frac{R2 - Rb}{R\max - Rb}\right) + Rb (Rb \le Rin < R\max)$$

According to the correction profile, a tone value within the background color range A12 is changed to a tone value within the background color range A12 and a tone value out of the background color range A12 is changed to a tone value within the background color range A12. More specifically, a tone value within a range C1 (see FIG. 7) from a minimum value Rmin (e.g., typically, "0") to the peak tone value Rb is changed to a tone value within a range A1 from the lower limit R1 to the peak tone value Rb of the background color range A12. A tone value within a range C2 (see FIG. 7) from the peak tone value Rb to a maximum value Rmax (e.g., "255") is changed to a tone value within a range A2 from the peak tone value Rb to the upper limit R2 of the background color range A12. As depicted in FIG. 8, in the correction profile, an output value Rout linearly increases with respect to an increase of an input value Rin. Therefore, in FIG. 8, four output values Rout1, Rout1, Rout3, and Rout4 corresponding to four input values Rin1, Rin1, Rin3, and Rin4 (Rin1<Rin2<Rin3<Rin4), respectively, satisfy a relationship of Rout1< Rout2<Rout3<Rout4. That is, a magnitude relationship between values of two pixels is not changed between before and after the correction process using the correction profile.

In step S67, the correction portion 131 corrects the value (e.g., the R value) of each pixel included in the R-component image data corresponding to the processing-target text area, using the correction profile depicted in FIG. 8.

Figure 9:
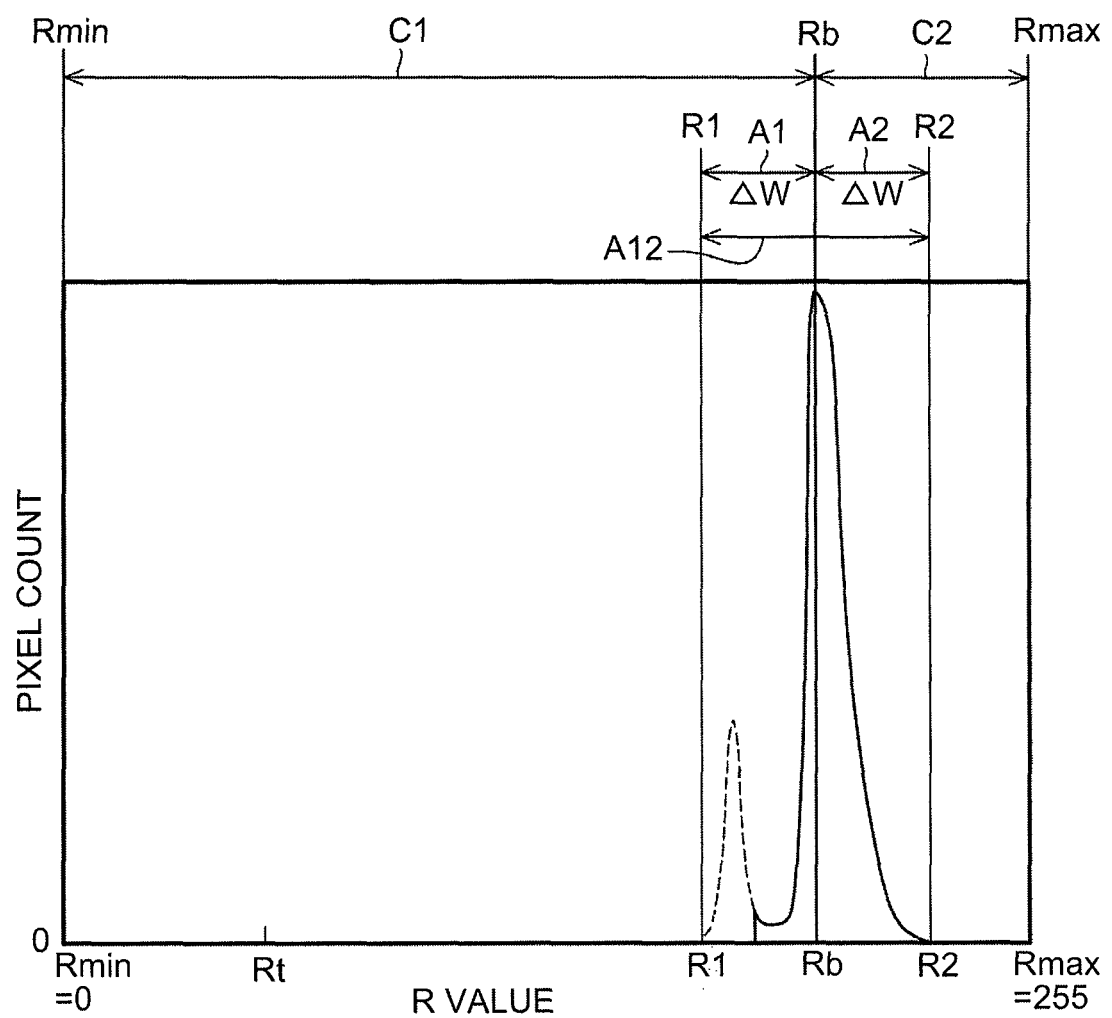
FIG. 9 illustrates a histogram for the R-component image data after a correction process is performed according to the first example embodiment of FIG. 8.

FIG. 9 illustrates a histogram for the post-corrected R-component image data according to the first embodiment. As understood from FIG. 9, after the correction process is performed, a count of pixels having respective tone values out of the background color range A12, that is, the count of pixels having the respective tone values within the range from Rmin to R1 and the count of pixels having the respective tone values within the range from R2 to Rmax, becomes zero. In the histogram obtained after the correction process is performed, a width of the mountain-shaped portion including the peak tone value Rb is narrower than the width of the mountain-shaped portion before the correction process is performed. A height of the mountain-shaped portion after the correction process is performed is higher than the height of the mountain-shaped portion before the correction process is performed. The changes of the width and height of the mountain-shaped portion after the correction process is performed are not shown accurately in FIG. 9 for the sake of simplicity in the drawing.

As understood from the correction profile depicted in FIG. 8, the values of the plurality of pixels having the respective different tone values (e.g., Rin1 and Rin2 in FIG. 8) out of the background color range A12 before the correction process is performed in step S67 are changed to respective different tone values (e.g., Rout1 and Rout2 in FIG. 8) within the background color range A12 through the correction process. Similarly, the values of the plurality of pixels having the respective different tone values (e.g., Rin3 and Rin4 in FIG. 8) within the background color range A12 before the correction process is performed are set to respective different tone values (e.g., Rout3 and Rout4 in FIG. 8) within the background color range A12 through the correction process.

It is understood that the value of the pixel representing one of the edges EG1 and EG2 (see FIG. 3D) of the text in the above-described background image BI (e.g., the R value in the vicinity of the position ET in FIGS. 6A and 7) has been changed to the tone value within the background color range A12 (see FIG. 9).

In step S68, the background image data generation portion 130 determines whether all of the three color component values have been corrected, in other words, whether all of the three pieces of component image data of the R, G, and B have been corrected. When one or more of the three color component values have not been corrected (e.g., step S68:NO), the routine returns to step S62 and the background image data generation portion 130 selects another yet-to-be selected color component and performs the processing of steps S63 to S68. In the above description, the correction performed on the R-component image data has been described. With respect to each of the G-component image data and the B-component image data, a background color range according to one of the peak tone values Gb and Bb is determined (e.g., step S65), and a correction profile according to the determined background color range is generated (e.g., step S66). Then, an appropriate correction process is performed on each of the G-component image data and the B-component image data, using the appropriate one of the generated correction profiles. The same fixed value (e.g., "15") is used for the value ΔW defining the background color range in the three components of R, G, and B.

When all of the three color component values have been corrected (e.g., step S68:YES), the background image data generation portion 130 determines whether all of the text areas have been selected (e.g., step S69). When all of the text areas have not been selected (e.g., step S69:NO), the routine returns to step S61, and the background image data generation portion 130 selects another yet-to-be selected text area and performs the processing of steps S62 to S69. When all of the text areas have been selected (e.g., step S69:YES), the background image data generation portion 130 ends the background image data adjustment process.

According to the above-described embodiment, as understood from the correction profile depicted in FIG. 8, the correction portion 131 changes the values (e.g., the R, G, and B values) of the pixel having the tone value within the background color range A12 before the correction process is performed in step S67 (referred to as a "first-type pixel") to the tone value within the background color range A12 through the correction process in step S67. The correction portion 131 changes the values of the pixel having the tone value out of the background color range A12 before the correction process is performed in step S67 (referred to as a "second-type pixel") to the tone value within the background color range A12 through the correction process in S67. As a result, both the values of the first-type pixel and the values of the second-type pixel are set to the respective tone values within the background color range. Therefore, the values of the second-type pixel that relatively greatly differ from the peak tone values Rb, Gb, and Bb corresponding to the background, are changed to respective values more closer to the respective peak tone values corresponding to the background. In other words, the values of the second-type pixel representing one of the text edges EG1 and EG2 that tend to remain in the background image BI are changed to the respective values more closer to the respective peak tone values corresponding to the background, that is, the respective tone values representing the background color value BC. Thus, the obtrusiveness of the text edges EG1 and EG2 that tend to remain in the background image BI can be reduced. The background color range A12 is set to be a relatively narrow range. Therefore, the values of the second-type pixel become sufficiently closer to the respective tone values representing the background color value BC. Accordingly, the background image data generation portion 130 can reduce the obtrusiveness of the edges EG1 and EG2 remaining in the background image BI after the correction process is performed, to the extent that the edges EG1 and EG2 cannot be identified visually, and thus, can substantially diminish the visibility of the edges EG1 and EG2 from the background image BI.

The reduction of the obtrusiveness of the text edges EG1 and EG2 that tend to remain in the background image BI results in an increase of the image quality of the image represented by the high compression PDF file CF generated in step S75 in FIG. 2. More specifically, when the image is displayed with the background image BI superimposed with the binary images TIA and TIB representing the text, the roughness of the text edges and a double vision of the text edges can be reduced or prevented.

More specifically, it is assumed that values of a plurality of second-type pixels having respective tone values out of the background color range are changed to the same tone value (e.g., the peak tone value), for example, a case where the entire text area in the background image BI is solidly filled with the background color. In this case, there is a possibility that the appearance of the background in the text area is changed by the correction. When the appearance of the background in the text area is changed, for example, an unnatural border line may appear between the text area and the area surrounding the text area in the background image BI due to a difference in appearance between the text area and the area surrounding the text area. According to this embodiment, the obtrusiveness of the text edges EG1 and EG2 remaining in the background image BI is reduced while the appearance of the background in the text area is maintained. With this configuration, such a problem of the appearance of the unnatural border line can be restricted.

When the background image data is compressed in step S70 in FIG. 2 while the edges EG1 and EG2 remain in the background image BI, there may be caused a problem that the data volume of the compressed background image data is not reduced sufficiently. According to this embodiment, the reduction of the obtrusiveness of the edges EG1 and EG2 in the background image BI results in an increase of the evenness of the color of the background of the text in the background image BI. That is, the number of colors representing the background of the text in the background image BI can be reduced. Thus, the data volume of the compressed background image data can be reduced.

As depicted in FIG. 8, through the correction performed in step S67, the value of the pixel having the tone value Rin1 is changed to the tone value Rout1 and the value of the pixel having the tone value Rin2 (Rin1<Rin2) is changed to the tone value Rout2 (Rout1<Rout2). As a result, the obtrusiveness of the text edges EG1 and EG2 that tend to remain in the background image BI can be reduced more effectively. For example, as compared with a case where the values of the plurality of pixels having the respective tone values out of the background color range are changed to the same tone value (e.g., the peak tone value) or a case where the magnitude relationship between values of two pixels is reversed between before and after the correction process, the difference caused in appearance of the background in the background image BI between before and after the correction process can be reduced. As described above, according to this embodiment, the obtrusiveness of the text edges EG1 and EG2 that tend to remain in the background image BI can be reduced while the appearance of the background of the text area in the original image SI is maintained.

The background image data generation portion 130 changes the values of each of the text constituting pixels of the original image SI to the peak tone value corresponding to background of text so as to generate the pre-corrected background image data (referred to as "intermediate image data"), based on the original image data (e.g., step S40 in FIG. 2). Then, the background image data generation portion 130 performs the background image data adjustment process on the intermediate image data (e.g., step S60 in FIG. 2). The background image data adjustment process comprises the correction process performed by the correction portion 131.

Instead of this, the generation of the intermediate image data (e.g., step S40 in FIG. 2) may be omitted. That is, the background image data generation portion 130 may perform the background image data adjustment process (e.g., step S60 in FIG. 2) on the original image data representing the original image SI in the FIG. 3A. In this case, a text area (e.g., TA1 and TA2 in FIG. 3A) targeted for the background image data adjustment process may include both the text designated to disappear by the processing of step S40 in FIG. 2 and the remaining edges EG1 and EG2. Therefore, the portion indicated by the dashed line in each of FIGS. 6A, 6B, 6C, and 7, that is, the mountain-shaped portion including the peak corresponding to the text may appear in the histogram generated in step S63 in FIG. 5. Then, the values of the plurality of pixels constituting the entire text including the edges EG1 and EG2 may be changed to the respective tone values within the background color range A1 by the correction process in step S67 in the background image data adjustment process. As understood from the above description, in the case where the background image data adjustment process is performed on the original image data because of the omission of the processing of step S40 in FIG. 2, the background image data representing the background image BI in which the text has disappeared may be generated, as in the case where the processing of step S40 in FIG. 2 is performed. Thus, the obtrusiveness of the text edges EG1 and EG2 that tend to remain in the background image BI can be also reduced.

B. Second Example Embodiment

In a background image data adjustment process according to a second embodiment, a correction profile generated in step S66 in FIG. 5 is different from the correction profile (see FIG. 8) according to the first embodiment. The other processing steps are the same as the processing performed in the image processing (see FIGS. 2 and 5) according to the first embodiment, and can be performed using the computer 200 or other equipment as explained above as well. As is the case with the first embodiment, the processing of step S40 in FIG. 2 can be omitted in the second embodiment.

Figure 10:
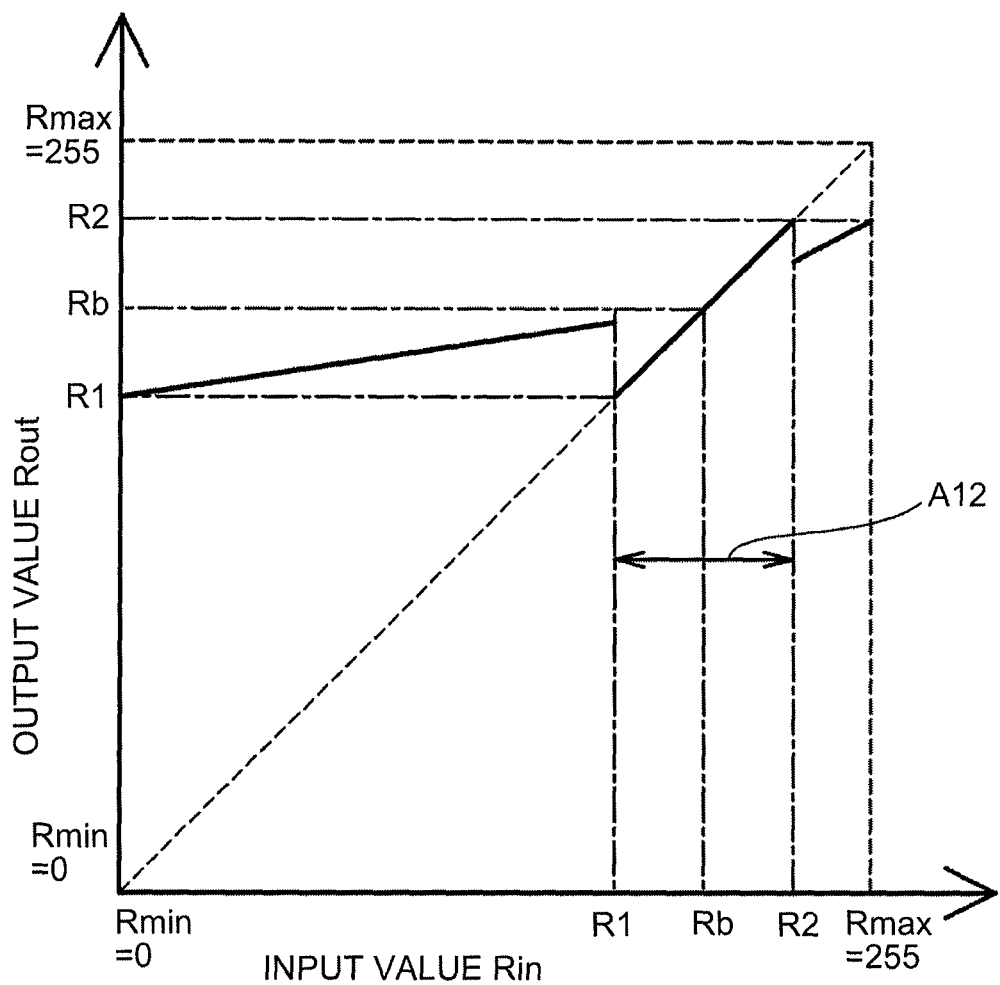
FIG. 10 illustrates a correction profile according to a second example embodiment.

FIG. 10 illustrates a correction profile according to the second embodiment. The correction profile is a one-dimensional lookup table for correcting the R-component image data. The correction profile is by expression (5) below.

$$Rout = Rin \times \left(\frac{Rb - R1}{Rb - R\min}\right) + R1 (R\min \le Rin < R1) \quad (5)$$
$$Rout = Rin (R1 \le Rin < R2)$$
$$Rout = (Rin - Rb) \times \left(\frac{R2 - Rb}{R\max - Rb}\right) + Rb (R2 \le Rin < R\max)$$

A point in which the correction profile depicted in FIG. 10 differs from the correction profile depicted in FIG. 8 according to the first embodiment is that a tone value within the background color range A12 is not changed. That is, as shown in expression (5), when an input value Rin is within a range of R1≤Rin<R2, the input value Rin is set to be equal to the output value Rout (i.e., Rin=Rout). That is, in some embodiments, the existing tone value is reassigned to become the output tone value for the target pixel. In the correction profile depicted in FIG. 10, a tone value out of the background color range is changed to a tone value within the background color range in the similar manner to the tone value out of the background color range in the correction profile depicted in FIG. 8.

Figure 11:
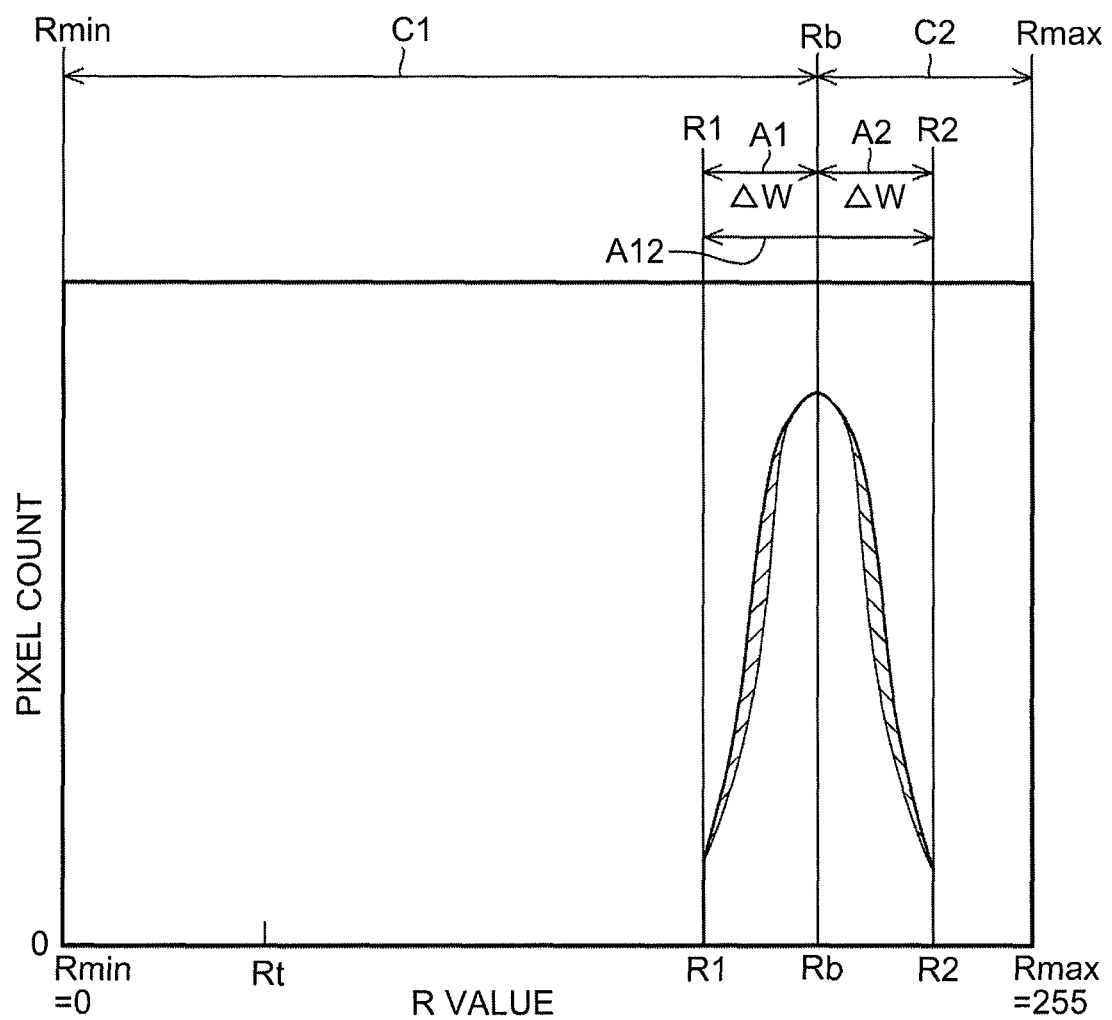
FIG. 11 illustrates a histogram for the R-component image data after a correction process is performed according to the second example embodiment of FIG. 10.

FIG. 11 is a histogram for the post-corrected R-component image data according to the second embodiment. In the post-corrected R-component image data, as in the case of the first embodiment (see FIG. 9), the count of pixels having the tone values out of the background color range A12, that is, the count of pixels having the tone values within the range from Rmin to R1 and the count of pixels having the tone values within the range from R2 to Rmax become zero. In contrast to the first embodiment, however, in the histogram after the correction process is performed, the shape (e.g., the width and height) of the mountain-shaped portion including the peak tone value Rb is substantially the same as the shape of the mountain-shaped portion before the correction process is performed. A hatched portion in FIG. 11 represents an area corresponding to a frequency count increased by the correction process. As described above, the shape of the mountain-shaped portion including the peak tone value Rb is slightly changed between before and after the correction process, by the increase of the frequency count in the background color range A12. The component image data of the other color components have the same characteristics described above.

In the first embodiment, the change is found in the shape of the mountain-shaped portion including the peak tone value Rb between before and after the correction process because the tone value within the background color range A12 is changed (see FIGS. 7 and 9). Therefore, there is a possibility that the appearance of the background in the background image BI differs from each other between before and after the correction process. More specifically, the shape of the mountain-shaped portion including the peak tone value is changed to be narrower and higher. Therefore, noises are reduced in the background of the text after the correction process is performed, and thus, there is a possibility that the appearance of the background of the text after the correction process has a grainy texture less than the background of the text before the correction process is performed, and thus, has a glossy texture. On the other hand, in the second embodiment, the values (e.g., the R, G, and B values) of the first-type pixel having the tone value within the background color range A12 is not changed. Thus, the shape of the mountain-shaped portion including the peak tone value is not changed substantially between before and after the correction process. Therefore, the difference caused in the appearance of the background in the background image BI between before and after the correction process can be reduced. Accordingly, the image represented by the high compression PDF file CF can be represented more closely to the original image SI.

In the second embodiment, the correction process using the expression (5) is performed on a pixel having a tone value within the background color range A12 and a pixel having a tone value out of the background color range A12. Therefore, as understood from expression (5), the value of the pixel having the tone value within the background color range A12 is not changed. In other words, although a tone value of a pixel having a tone value within the background color range A12 is maintained as it is, the pixel having a tone value within the background color range A12 is handled as a pixel eligible for the correction-target, similar to the pixel having the tone value out of the background color range A12. Instead of this, the pixel having the tone value within the background color range A12 may be handled as a pixel ineligible for the correction-target in contrast to the pixel having the tone value out of the background color range A12. More specifically, the correction process may be performed using expression (6) below.

$$Rout = Rin \times \left(\frac{Rb - R1}{Rb - R\min}\right) + R1 (R\min \le Rin < R1) \quad (6)$$

$$Rout = (Rin - Rb) \times \left(\frac{R2 - Rb}{R\max - Rb}\right) + Rb (R2 \le Rin < R\max)$$

In this case, first, it may be determined whether a value of a target pixel is one of the tone values within the background color range A12. When the value of the target pixel is one of the tone values within the background color range A12, it may be determined that the target pixel is a pixel ineligible for the correction target, and thus, the correction process using expression (6) might not be performed on the target pixel. Rather, in this example, the pixel value is set by simply retaining the same pixel value as was associated with the target pixel prior to the correction process. When the value of the target pixel is one of the tone values out of the background color range A12, it may be determined that the target pixel is a pixel eligible for the correction target, and thus, the correction process using expression (6) may be performed on the target pixel.

C. Third Example Embodiment

In a background image data adjustment process according to a third embodiment, the processing for determining the background color range in step S65 of FIG. 5 differs from the processing for determining the background color range according to the first embodiment. For example, as the background color range A12 for correcting the R-component image data is depicted in FIG. 9, the width of the background color range A12 according to the first embodiment is determined to the fixed width (e.g., 2×ΔW) of the range centered at the peak tone value (e.g., Rb in FIG. 9). Instead of this, the width of the background color range according to the third embodiment is determined in accordance with the histogram (FIG. 7) for the processing-target component image data. Therefore, the width of the background color range according to the third embodiment may vary by component image data, that is, on a basis of color component of R, G, and B. The other processing of the image processing according to the third embodiment are the same as the corresponding processing of the image processing (see FIGS. 2 and 5) according to the first embodiment. Further, as in the case of the first embodiment, the processing of step S40 in FIG. 2 can also be omitted in the third embodiment. Hereinafter, the determination method of the background color range according to the third embodiment will be described by taking a case where the R-component image data (see FIG. 9) is regarded as a processing target, as an example.

Figure 12:
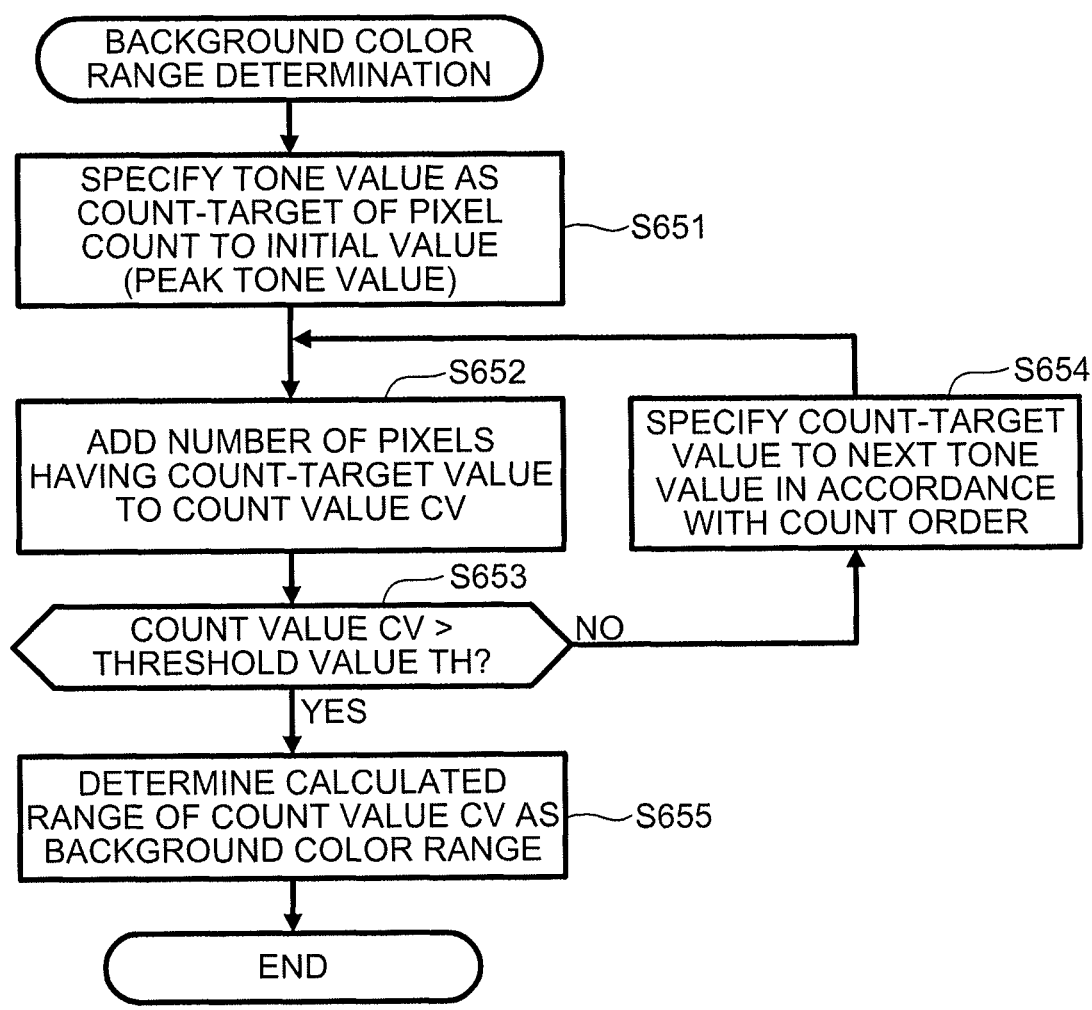
FIG. 12 is a flowchart of a background color range determination process according to a third example embodiment.
Figure 13:
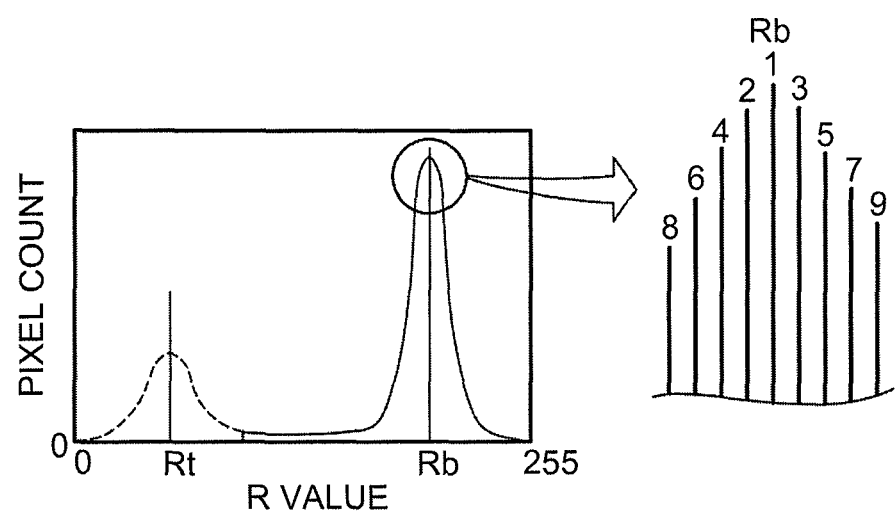
FIG. 13 is an explanatory diagram for the background color range determination process according to the third example embodiment of FIG. 12.

FIG. 12 is a flowchart depicting the process for determining the background color range according to the third embodiment. FIG. 13 is an explanatory diagram for the process for determining the background color range according to the third embodiment. The flowchart depicted in FIG. 12 shows a detail of the processing of step S65 in FIG. 5. In step S651, the specific range determination portion 133 sets a tone value (e.g., a class) whose pixel count (e.g., frequency count) is eligible to be counted, to an initial value of a count target, in the histogram for the processing-target component image data. In this embodiment, the initial value of the count-target tone value is the peak tone value Rb.

In step S652, the specific range determination portion 133 obtains the number of pixels having the count-target tone value (also, referred to as a "count target value") using the histogram data, and adds the obtained value to a count value CV. Thus, in the step S652 of first-time, the value of the count value CV is equal to the number of pixels having the peak tone value Rb.

In step S653, the specific range determination portion 133 determines whether the count value CV is greater than a threshold value TH. The threshold value TH is a design value that is determined experimentally to cover substantially the entire mountain-shaped portion (e.g., a range including relatively most of the frequency counts) with respect to the peak tone value Rb in the histogram, for example. In this embodiment, the specific range determination portion 133 uses 90 percent of the total number of pixels in the processing-target text area, as the threshold value TH.

When the count value CV is smaller than or equal to the threshold value TH (e.g., step S653:NO), the specific range determination portion 133 sets the count-target value to a next tone value in accordance with the count order (e.g., step S654). In FIG. 13, the count order is depicted on the right thereof. In the count order according to this embodiment, first, the peak tone value Rb corresponding to the background is specified as the count-target value (i.e., the initial value), and secondarily, the tone value that is one tone closer to the tone value Rt representing the color of the text than the peak tone value Rb is specified as the count-target value. Thirdly, the tone value that is one tone far from the tone value Rt than the peak tone value Rb is specified as the count-target value. Thereafter, a tone value that is closer to the tone value Rt than the peak tone value Rb and a tone value that is far from the tone value Rt than the peak tone value Rb are specified alternately as the count target value in increasing order of distance from the peak tone value Rb. Generally, when the peak tone value Rb is closer to the maximum value Rmax (e.g., 255) rather than the minimum value Rmin (e.g., 0) (e.g., when Rb>128), the tone value Rt representing the text is smaller than the peak tone value Rb (i.e., Rb>Rt). When the peak tone value Rb is closer to the minimum value Rmin rather than the maximum value Rmax (e.g., when Rb≤128), the tone value Rt representing the text is greater than the peak tone value Rb (i.e., Rb<Rt). Therefore, for example, when Rb>128, the specific range determination portion 133 sets the tone value that is one tone lower than the peak tone value Rb to the second count-target value, and when Rb≤128, the specific range determination portion 133 sets the tone value that is one tone higher than the peak tone value Rb to the second count-target value.

When a new count-target value is specified (e.g., step S654), in step S652, the specific range determination portion 133 adds the number of pixels having the newly-specified count-target value to the count value CV. Thereafter, the specific range determination portion 133 repeats the specification of a new count-target value (e.g., step S654) and the addition of the number of pixels to the count value CV (e.g., step S652) until the count value CV becomes greater than the threshold value TH.

When the count value CV is greater than the threshold value TH (e.g., step S653:YES), the specific range determination portion 133 determines a calculation range of the count value CV to the background color range (e.g., step S655). That is, the range specified by the all tone values set to the count target value is determined as the background color range before the routine proceeds to step S655.

As described above, according to this embodiment, the specific range determination portion 133 determines the width of the background color range according to the histogram data (e.g., the distribution data). Therefore, the width of the background color range can be determined appropriately based on the tone value distribution of the processing-target component image data. More specifically, as understood from the flowchart depicted in FIG. 12, the specific range determination portion 133 determines the background color range such that the number of pixels having the respective tone values within the background color range becomes greater than the reference value (e.g., the threshold value TH).

Figure 14A:
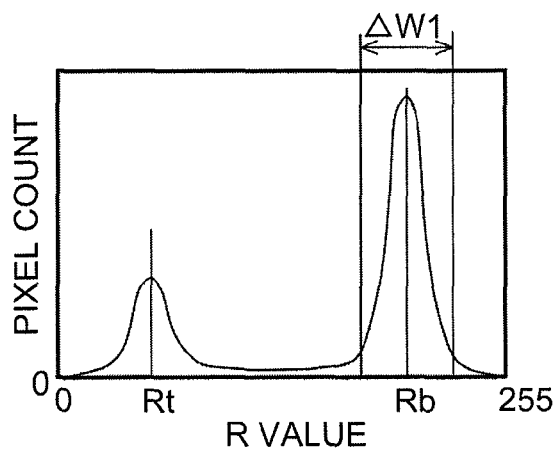
FIGS. 14A and 14B each illustrate an example of the background color range according to the third example embodiment of FIG. 12.
Figure 14B:
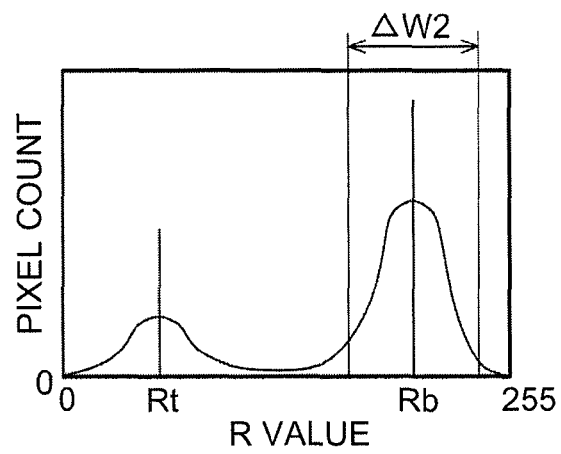

FIGS. 14A and 14B each illustrate an example of the background color range according to the third embodiment. FIG. 14A illustrates a histogram in a case where the width of the mountain-shaped portion including the peak tone value Rb is relatively narrow, in other words, in a case where the dispersion of the values of the plurality of pixels representing the background is relatively small. FIG. 14B illustrates a histogram in a case where the width of the mountain-shaped portion including the peak tone value Rb is relatively wide, in other words, in a case where the dispersion of the values of the plurality of pixels representing the background is relatively large. As understood from the drawings, the specific range determination portion 133 sets the width of the background color range to be wider as the dispersion of the values of plurality of pixels representing the background in the processing-target component image data is larger. That is, when the histogram data represents that the dispersion of the values of the plurality of pixels representing the background in the processing-target component image data is relatively small, the width of the background color range is determined to be a first width ΔW1 (see FIG. 14A). When the histogram data represents that the dispersion of the values of the plurality of pixels representing the background in the processing-target component image data is relatively large, the width of the background color range is determined to be a second width ΔW2 that is wider than the first width ΔW1 (see FIG. 14B).

For example, when an excessively-wider background color range is applied in spite of the fact that the above-described dispersion is relatively small, that is, the fact that the width of the mountain-shaped portion including the peak tone value Rb is narrow, the value of the pixel having the tone value out of the background color range before the correction process is performed might not be changed to be closer enough to the peak tone value Rb through the correction process. In this case, the obtrusiveness of the text edges EG1 and EG2 (see FIG. 3D) that tend to remain in the background image BI might not be reduced. On the other hand, when an excessively-narrower background color range is applied in spite of the fact that the above-described dispersion is relatively large, that is, the fact that the width of the mountain-shaped portion including the peak tone value Rb is wide, the number of second-type pixels having the respective tone values out of the background color range before the correction process is performed increases excessively. In this case, the values of the second-type pixels are changed by the correction process, and thus, the number of pixels having the tone values out of the background color range becomes zero. Therefore, there is a possibility that the appearance of the background of the text in the background image BI differs from each other between before and after the correction process. According to this embodiment, the width of the background color range is determined appropriately based on the dispersion of the values of the plurality of pixels representing the background. Thus, the above-described problems can be reduced.

The determination method of the background color range according to the third embodiment may be adopted to the background image data adjustment process according to the first embodiment or the background image data adjustment process according to the second embodiment. In both the cases, the width of the background color range can be determined appropriately based on the tone value distribution of the processing-target component image data.

D. Fourth Example Embodiment

FIG. 15 is a flowchart of a background image data adjustment process according to a fourth embodiment. In the fourth embodiment, the background image data adjustment process is performed without using the correction profile. More specifically, in the background image data adjustment process according to the fourth embodiment, processing of steps S671 to S674 in FIG. 15 are performed instead of the processing of steps S66 and S67 in the background image data adjustment process (see FIG. 5) according to the first embodiment. Details of processing in the other steps in the background image data adjustment process according to the fourth embodiment are the same as the details of the processing in the steps assigned the same step numbers, respectively, in the background image data adjustment process according to the first embodiment.

In step S671, the correction portion 131 selects one pixel having a tone value out of the background color range from all of the pixels included in the processing-target component image data, as a processing-target pixel.

In step S672, the correction portion 131 acquires one tone value randomly from a plurality of tone values within the background color range.

In step S673, the correction portion 131 changes the value of the processing-target pixel (e.g., one of the R, G, and B values) to the tone value randomly acquired in step S672.

In step S674, the correction portion 131 determines whether all of the pixels having the respective tone values out of the background color range have been selected as the processing-target pixel. When there are one or more pixels that have not been selected yet (e.g., step S674:NO), the routine returns to step S671. In step S671, the correction portion 131 selects another yet-to-be selected pixel as the processing-target pixel and repeatedly performs the processing of steps S672 to S673. When all of the pixels having the respective tone values out of the background color range have been selected as the processing-target pixel (e.g., step S674: YES), the correction portion 131 proceeds the routine to step S68.

As described above, according to the fourth embodiment, the correction portion 131 changes the value of the second-type pixel having the tone value out of the background color range before the correction process is performed, to the tone value randomly selected from the plurality of tone values within the background color range. As a result, the obtrusiveness of the text edges EG1 and EG2 that tend to remain in the background image BI can be reduced. For example, as is the case with the first embodiment, it is assumed below the case where the magnitude relationship between a value of a first pixel and a value of a second pixel of the plurality of second-type pixels having the respective tone values out of the background color range is maintained between before and after the correction process. In this case, the values of the plurality of pixels representing the text edges EG1 and EG2 that tend to remain in the background image BI are changed so as to be closer to the peak tone value corresponding to the background color through the correction process. Nevertheless, the magnitude relationship between the values of the plurality of pixels representing the edges EG1 and EG2 and the values of surrounding pixels tends to be maintained between before and after the correction process. Therefore, for example, when the width of the background color range is relatively large, that is, when the degree that the values of plurality of pixels representing the edges EG1 and EG2 becomes closer to the peak tone value corresponding to the background color through the correction process is relatively small, there is a possibility that the obtrusiveness of the text edges EG1 and EG2 that tend to remain in the background image BI cannot be reduced adequately. According to the fourth embodiment, the values of the pixels representing the edges EG1 and EG2 are changed to the value randomly selected from the values of the pixels surrounding the edges EG1 and EG2. As a result, the magnitude relationship between the values of the plurality of pixels representing the edges EG1 and EG2 and the values of surrounding pixels is changed randomly. Therefore, even when the width of the background color range is relatively wide, the obtrusiveness of the text edges EG1 and EG2 that tend to remain in the background image BI can be reduced adequately.

In the fourth embodiment, similar to the second embodiment, the value of the first-type pixel having the tone value within the background color range before the correction process is performed is not changed. Therefore, the shape of the mountain-shaped portion including the peak tone value is almost maintained, between before and after the correction process, in the histogram for the processing-target component image data. This is because the number of first-type pixels having the respective tone values within the background color range before the correction process is performed is far greater than the number of second-type pixels having the respective tone values out of the background color range before the correction process is performed. Thus, even when the value of the second-type pixel is determined at random, the possibility that the appearance of the background in the text area differs from each other between before and after the correction process can be reduced.

In the fourth embodiment, similar to the first embodiment, the value of the first-type pixel having the tone value within the background color range before the correction process is performed may be changed. For example, in a similar manner as the changing of the value of the second-type pixel, the value of the first-type pixel having the tone value within the background color range before the correction process is performed may be changed to the randomly-determined tone value within the background color range. In this case, although there is a higher possibility that the appearance of the background in the text area differs from each other between before and after the correction process, the obtrusiveness of the text edges EG1 and EG2 that tend to remain in the background image BI can be reduced adequately even when the width of the background color range is relatively wide. In the fourth embodiment, the width of the background color range may be set to the fixed value ($2 \times \Delta W$) similar to the first embodiment or dynamically determined using the distribution data of the processing-target component image data similar to the third embodiment.

E. Variations (1) The correction profiles (see FIGS. 8 and 10) according to the first and the second embodiments are merely examples. For example, in the correction profile depicted in FIG. 8, the output value Rout increases monotonically and linearly with respect to the increase of the input value Rin within the range of $Rmin \leq R < Rb$. Nevertheless, in the correction profile, the increase of the output value Rout is not necessarily limited to linearly increasing. It may be required only that the output value Rout increases monotonically with respect to the increase of the input value Rin within the range of $Rmin \leq R < Rb$ in the input value Rin. For example, the correction profile may be determined such that the output value Rout increases monotonically step by step with respect to the increase of the input value Rin. For another example, the correction profile may be determined such that the output value Rout increases monotonically along a curve (e.g., an asymptote) with respect to the increase of the input value Rin. The output value Rout may also increase in the same manner with respect to the increase of the input value Rin within the range of $Rb \leq R < Rmax$ in the input value Rin. As described in the first embodiment, the correction portion 131 may perform the correction process to change the value of the first-type pixel having the tone value within the background color range before the correction process is performed. As described in the second embodiment, the correction portion 131 may maintain the value of the first-type pixel between before and after the correction process. Generally speaking, it may be required only that the correction portion 131 performs the correction process on the processing-target image data such that the value of the first-type pixel having the tone value within the background color range before the correction process is performed is set to the tone value within the background color range after the correction process is performed and the value of the second-type pixel having the tone value out of the background color range before the correction process is performed is set to the tone value within the background color range after the correction process is performed. By doing so, the obtrusiveness of the text outline that tends to remain in the background image can be reduced. In some cases, this reduced obtrusiveness causes improved sharpness of the text in the visual representation of the processed image data, thereby improving readability.

(2) In the second embodiment, the correction portion 131 does not change the values of all of the first-type pixels having the respective tone values within the background color range before the correction process is performed. Instead of this, for example, the correction portion 131 might not change a value of a first-type pixel having a tone value within a range that may be narrower than the background color range and may include the peak tone value Rb, but may change values of the other first-type pixels.

(3) In the first and second embodiments, the correction portion 131 changes the values of all of the second-type pixels having the respective tone values out of the background color range before the correction process is performed to the respective tone values within the background color range. Instead of this, for example, the correction portion 131 may change only a value of a pixel having the tone value (e.g., a tone value within the range of $Rmin \leq R < R1$ in FIG. 7) closer to the text-color-tone-value (e.g., Rt in FIG. 7) with reference to the peak tone value corresponding to the background (e.g., Rb in FIG. 7), of the values of all of the second-type pixels, into the tone value within the background color range.

(4) In the above-described embodiments, the color scan data including the three pieces of component image data corresponding to the three components are used as the original image data. Nevertheless, for example, monochrome scan data including a piece of component image data may be used as the original image data. In this case, the background image data generation portion 130 may perform the processing that may be performed on the three pieces of the component image data (e.g., the processing of steps S63 to S67 in FIG. 5) in the above-described embodiments, on the component image data of the monochrome scan data.

(5) It can be construed that the image processing according to the first embodiment is image processing in which the background image data representing the background image including the text outline is obtained in step S40 in FIG. 2 and the background image data adjustment process of step S60 in FIG. 2, that is, the correction process for reducing the obtrusiveness of the text outline in the background image, is performed on the background image data. In the above-described embodiments, the background image data is obtained in the process of generating the high compression PDF file. Nevertheless, instead of this, for example, the background image data may be obtained from the generated high compression PDF without performing the background image data adjustment process. In this case, for example, the computer may perform the background image data adjustment process on the background image data to reproduce the original image in which the obtrusiveness of the text outline of may be reduced, or the computer may perform the background image data adjustment process on the background image data to generate a high compression PDF file having higher compressibility.

(6) In the above-described embodiments, the background color range is centered at the peak tone value corresponding to the background. That is, the upper limit and the lower limit of the background color range are determined such that a width from the peak tone value to the lower limit is substantially equal to a width from the peak tone value to the upper limit. Instead of this, for example, the width from the peak tone value to the lower limit may differ from the width from the peak tone value to the upper limit.

(7) In the above-described embodiments, the image processing function of the scanner driver 100 is implemented by the computer 200. Instead of this, for example, the image processing function may be implemented by a control device equipped in a device, such as a multifunction peripheral, a digital camera, or a scanner, or a server that may be communicable with such a device via a network. The image processing function may be implemented by a single device or by a plurality of devices connected with each other via a network (e.g., a server and one of a scanner and a multifunction peripheral). In this case, a system comprising the plurality of devices that may implement the image processing function may correspond to the image processing device. For example, the scanner 300 may generate scan data in response to a reading instruction provided by the computer 200, and transmit the scan data to a server. The server may perform the image processing (see FIG. 2) according to one of the above-described embodiments using the scan data to generate a high compression PDF file, and then transmit the high compression PDF file to one of the scanner 300 and the computer 200.

(8) Part of the configurations implemented by hardware in the above-described embodiments may be replaced with software, or conversely, part of the configurations implemented by software in the above-described embodiments may be replaced with hardware. Accordingly, a processor, as described herein, can be configured to perform the methods and processes described herein by execution of software stored in memory, or based on special-purpose logic or other hardware implemented therein.

Referring to FIGS. 1-15 overall, it is noted that although the embodiments discussed above provide examples that process image data represented in an "RGB" format, other image data formats could be used as well. In some examples, image data could be represented in a YUV format, YCbCr format, or other image formats.

Further referring to FIGS. 1-15, embodiments of the present disclosure can be implemented as a computer process (method), a computing system, or as an article of manufacture, such as a computer program product or computer readable media. The computer program product may be a computer readable storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

Although the invention has been described based on example embodiments and variations, the embodiments of the invention facilitate the understanding of the invention and do not limit the invention. The invention can be changed or modified without departing from the spirit of the invention and the scope of the claims and the invention includes the equivalents thereof.

What is claimed is:

1. An image processing device comprising:
a processor configured to:
generate text image data representing a text image based on original image data representing an original image; and
generate background image data representing a background image based on the original image data, wherein the background image represents an image in which text in the original image has disappeared,
wherein to generate background image data representing the background image data based on the original image data, the processor is configured to:
generate distribution data representing a tone value distribution of target image data as a processing target;
determine a specific range on the distribution data;
perform a correction process on the target image data for setting a value of a first-type pixel having a tone value within the specific range before the correction process is performed to a tone value within the specific range after the correction process is performed, and setting a value of a second-type pixel having a tone value out of the specific range before the correction process is performed to a tone value within the specific range after the correction process is performed,
wherein the specific range includes a plurality of consecutive tone values,
wherein the plurality of consecutive tone values included within the specific range include a peak tone value that is included in a tone value distribution of the original image data and corresponds to a background of the text; and wherein, to determine the specific range, the processor is configured to:
set a first width of the specific range, the first width determined from first distribution data representing a first dispersion of values of a plurality of pixels representing a background in the target image data; and
set a second width of the specific range, the second width determined from second distribution at a representing a second dispersion of values of the plurality of pixels representing the background in the target image data, the second dispersion being larger than the first dispersion;
wherein the second width is larger than the first width.

2. The image processing device according to claim 1, wherein to perform the correction process the processor is configured to:
change a value of a first pixel that is the second-type pixel having a first tone value out of the specific range before the correction process is performed to a second tone value within the specific range, and
change a value of a second pixel that is the second-type pixel having a third tone value out of the specific range before the correction process is performed to a fourth tone value within the specific range, the third tone value being closer to the peak tone value than the first tone value and the fourth tone value being closer to the peak tone value than the second tone value.

3. The image processing device according to claim 1, wherein to perform the correction process, the processor is configured to:
change a value of the second-type pixel having the tone value out of the specific range before the correction process is performed, to a tone value randomly selected from the plurality of consecutive tone values within the specific range.

4. The image processing device according to claim 1, wherein to perform the correction process, the processor is configured to:
change a value of the first-type pixel having the tone value within the specific range before the correction process is performed, to a tone value within the specific range; and
change a value of the second-type pixel having the tone value out of the specific range before the correction process is performed, to a tone value within the specific range.

5. The image processing device according to claim 1, wherein to perform the correction process, the processor is configured to:
change a value of the second-type pixel having the tone value out of the specific range before the correction process is performed, to a tone value within the specific range while not changing a value of the first-type pixel having the tone value within the specific range before the correction process is performed.

6. The image processing device according to claim 5, wherein, based on the tone value of the first-type pixel being within the specific range, the correction process retains the same pixel value as was associated with the target pixel prior to the correction process.

7. The image processing device according to claim 5, wherein, based on the tone value of the first-type pixel being within the specific range, the correction process reassigns to the first-type pixel the tone value of the first-type pixel.

8. The image processing device according to claim 1, wherein the correction process is performed on the original image data as the target image data.

9. The image processing device according to claim 1, wherein, to generate the background image data, the processor is configured to:
  generate intermediate image data based on the original image data by changing a value of a text constituting pixel that constitutes the text in the original image to the peak tone value, and
  wherein the correction process is performed on the intermediate image data as the target image data.

10. The image processing device according to claim 1, wherein the target image data comprises a plurality of component image data corresponding to a plurality of color components, and
  wherein the correction process is performed on each of the plurality of component image data.

11. The image processing device according to claim 1, wherein the processor is further configured to compress the background image data.

12. An image processing device comprising:
  a processor configured to:
    obtain background image data representing a background image, wherein the background image represents an image including an outline of text; and
    generate distribution data representing a tone value distribution of the background image data; and
    determine the specific range based on the distribution data; and
    perform a correction process on the background image data for setting a value of a first-type pixel having a tone value within the specific range before the correction process is performed to a tone value within the specific range after the correction process is performed, and setting a value of a second-type pixel having a tone value out of the specific range before the correction process is performed to a tone value within the specific range after the correction process is performed, wherein the correction process includes a process for reducing obtrusiveness of the outline of the text in the background image,
  wherein the specific range includes a plurality of consecutive tone values,
  wherein the plurality of consecutive tone values included within the specific range include a peak tone value that is included in a tone value distribution of the background image data and corresponds to a background of the outline of the text; and
  wherein to determine the specific range, the processor is configured to:
    set a first width of the specific range, the first width determined from first distribution data representing a first dispersion of values of a plurality of pixels representing a background in the target image data; and
    set a second width of the specific range, the second width determined from second distribution data representing a second dispersion of the values of the plurality of pixels representing the background in the target image data, the second dispersion being larger than the first dispersion;
  wherein the second width is larger than the first width.

13. A non-transitory computer-readable storage medium storing computer-readable instructions that, when executed, cause a processor to perform a method comprising:
  generating text image data representing a text image based on original image data representing an original image; and
  generating background image data representing a background image based on the original image data, wherein the background image represents an image in which text in the original image has disappeared,
  wherein the generating of the background image data comprises:
    performing a correction process on target image data setting a value of a first-type pixel having a tone value within a specific range before the correction process is performed to a tone value within the specific range after the correction process is performed, and a value of a second-type pixel having a tone value out of the specific range before the correction process is performed to a tone value within the specific range after the correction process is performed,
  wherein the specific range includes a plurality of consecutive tone values, and
  wherein the plurality of consecutive tone values included within the specific range include a peak tone value that is included in a tone value distribution of the original image data and corresponds to a background of the text;
  wherein the generating of the background image data comprises:
    generating distribution data representing a tone value distribution of the target image data; and
    determining the specific range based on the distribution data;
  wherein the determining of the specific range comprises:
    setting a width of the specific range, the first width determined from first distribution data representing a first dispersion of values of a plurality of pixels representing a background in the target image data; and
    setting a second width of the specific range, the second width determined from second distribution data representing a second dispersion of values of the plurality of pixels representing the background in the target image data, the second dispersion being larger than the first dispersion;
  wherein the second width is larger than the first width.

14. The non-transitory computer-readable storage medium according to claim 13, wherein the performing of the correction process comprises:
  changing a value of a first pixel that is the second-type pixel having a first tone value out of the specific range before the correction process is performed to a second tone value within the specific range, and
  changing a value of a second pixel that is the second-type pixel having a third tone value out of the specific range before the correction process is performed to a fourth tone value within the specific range, the third tone value being closer to the peak tone value than the first tone value and the fourth tone value being closer to the peak tone value than the second tone value.

15. The non-transitory computer-readable storage medium according to claim 13, wherein the performing of the correction process comprises:
  changing a value of the second-type pixel having the tone value out of the specific range before the correction process is performed, to a tone value randomly selected from the plurality of consecutive tone values within the specific range.

16. The non-transitory computer-readable storage medium according to claim 13, wherein the performing of the correction process comprises:
  changing a value of the first-type pixel having the tone value within the specific range before the correction process is performed, to a tone value within the specific range; and changing a value of the second-type pixel having the tone value out of the specific range before the correction process is performed, to a tone value within the specific range.

17. The non-transitory computer-readable storage medium according to claim 13, wherein the performing of the correction process comprises:
changing a value of the second-type pixel having the tone value out of the specific range before the correction process is performed, to a tone value within the specific range while not changing a value of the first-type pixel having the tone value within the specific range before the correction process is performed.

18. The non-transitory computer-readable storage medium according to claim 13, wherein the correction process is performed on the original image data as the target image data.

19. The non-transitory computer-readable storage medium according to claim 13, wherein the generating of the background image data comprises:
generating intermediate image data based on the original image data by changing a value of a text constituting pixel that constitutes the text in the original image to the peak tone value, and
wherein the correction process is performed on the intermediate image data as the target image data.

20. The non-transitory computer-readable storage medium according to claim 13, wherein the target image data comprises a plurality of component image data corresponding to a plurality of color components, and
wherein the correction process is performed on each of the plurality of component image data.

21. The non-transitory computer-readable storage medium according to claim 13, wherein the processor is further configured to perform compressing the background image data.

22. A non-transitory computer-readable storage medium storing computer-readable instructions that, when executed, cause a processor to perform a method comprising:
obtaining background image data representing a background image, wherein the background image represents an image including an outline of text; and
performing a correction process on the background image data for setting a value of a first-type pixel having a tone value within a specific range before the correction process is performed to a tone value within the specific range after the correction process is performed, and a value of a second-type pixel having a tone value out of the specific range before the correction process is performed to a tone value within the specific range after the correction process is performed, wherein the correction process includes a process for reducing obtrusiveness of the outline of the text in the background image,
wherein the specific range includes a plurality of consecutive tone values, and
wherein the plurality of consecutive tone values included within the specific range include a peak tone value that is included in a tone value distribution of the background image data and corresponds to a background of the outline of the text;
wherein the processor is further configured to perform:
generating distribution data representing a tone value distribution of the background image data; and
determining the specific range based on the distribution data;
wherein the determining of the specific range comprises:
setting a first width of the specific range, the first width determined from first distribution data representing a first dispersion of values of a plurality of pixels representing a background in the target image data; and
setting a second width of the specific range, the second width determined from second distribution data representing a second dispersion of values of the plurality of pixels representing the background in the target image data, the second dispersion being larger than the first dispersion;
wherein the second width is larger than the first width.

23. An image processing device comprising:
a processor configured to:
generate text image data representing a text image based on original image data representing an original image; and
generate background image data representing a background image based on the original image data, wherein the background image represents an image in which text in the original image has disappeared,
wherein to generate background image data representing the background image data based on the original image data, the processor is configured to:
generate intermediate image data based on the original image data by changing a value of a text constituting pixel that constitutes the text in the original image to a peak tone value, wherein the peak tone value is included in a tone value distribution of the original image data and corresponds to a background of the text;
perform a correction process on the generated intermediate image for setting a value of a first-type pixel having a tone value within a specific range before the correction process is performed to a tone value within the specific range after the correction process is performed, and setting a value of a second-type pixel having a tone value out of the specific range before the correction process is performed to a tone value within the specific range after the correction process is performed,
wherein the specific range includes a plurality of consecutive tone values, and
wherein the plurality of consecutive tone values included within the specific range include the peak tone value that is included in the tone value distribution of the original image data and corresponds to a background of the text.

24. The image processing device according to claim 23, wherein, to generate the background image data, the processor is configured to:
generate distribution data representing a tone value distribution of the intermediate image data; and
determine the specific range based on the distribution data.

25. The image processing device according to claim 23, wherein the intermediate image data comprises a plurality of component image data corresponding to a plurality of color components, and
wherein the correction process is performed on each of the plurality of component image data.

26. The image processing device according to claim 23, wherein the processor is further configured to compress the background image data.

27. A non-transitory computer-readable storage medium storing computer-readable instructions that, when executed, cause a processor to perform a method comprising:
generating text image data representing a text image based on original image data representing an original image; and
generating background image data representing a background image based on the original image data, wherein the background image represents an image in which text in the original image has disappeared, wherein the generating of the background image data comprises:

performing a correction process on target image data setting a value of a first-type pixel having a tone value within a specific range before the correction process is performed to a tone value within the specific range after the correction process is performed, and a value of a second-type pixel having a tone value out of the specific range before the correction process is performed to a tone value within the specific range after the correction process is performed, wherein the specific range includes a plurality of consecutive tone values, and wherein the plurality of consecutive tone values included within the specific range include a peak tone value that is included in a tone value distribution of the original image data and corresponds to a background of the text;

wherein the generating of the background image data comprises:

generating intermediate image data based on the original image data by changing a value of a text constituting pixel that constitutes the text in the original image to the peak tone value, wherein the peak tone value is included in the tone value distribution of the original image data and corresponds to the background of the text, and wherein the correction process is performed on the intermediate image data as the target image data.

28. The non-transitory computer-readable storage medium according to claim 27, wherein the generating of the background image data comprises:

generating distribution data representing a tone value distribution of the intermediate image data; and determining the specific range based on the distribution data.

29. The non-transitory computer-readable storage medium according to claim 27, wherein the intermediate image data comprises a plurality of component image data corresponding to a plurality of color components, and wherein the correction process is performed on each of the plurality of component image data.

30. The non-transitory computer-readable storage medium according to claim 27, wherein the processor is further configured to perform compressing the background image data.

* * * * *